US006728219B1

(12) United States Patent
Leong et al.

(10) Patent No.: US 6,728,219 B1
(45) Date of Patent: Apr. 27, 2004

(54) GRAPHICAL USER INTERFACE SYSTEM AND METHOD FOR VISUALLY GAUGING NETWORK PERFORMANCE

(75) Inventors: Pak-Tak Patrick Leong, Mountain View, CA (US); King L. Won, San Jose, CA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 0 days.

(21) Appl. No.: 10/224,443

(22) Filed: Aug. 19, 2002

Related U.S. Application Data

(63) Continuation of application No. 09/440,804, filed on Nov. 15, 1999.

(51) Int. Cl.[7] .................................................. H04J 3/14
(52) U.S. Cl. ..................................... 370/252; 345/736
(58) Field of Search ................................ 370/241, 245, 370/252, 253; 345/733, 736, 738; 714/46

(56) References Cited

U.S. PATENT DOCUMENTS

| | | | | |
|---|---|---|---|---|
| 5,442,741 A | * | 8/1995 | Hughes et al. ............... | 345/442 |
| 5,793,753 A | * | 8/1998 | Hershey et al. .............. | 370/252 |
| 5,809,282 A | | 9/1998 | Cooper et al. ............... | 395/500 |
| 5,819,028 A | * | 10/1998 | Manghirmalani et al. ..... | 714/57 |
| 5,850,388 A | * | 12/1998 | Anderson et al. ............ | 370/252 |
| 5,929,855 A | * | 7/1999 | Benton et al. ............... | 345/736 |
| 5,937,165 A | | 8/1999 | Schwaller et al. ..... | 395/200.54 |
| 5,950,195 A | | 9/1999 | Stockwell et al. ............ | 707/4 |
| 5,953,009 A | | 9/1999 | Alexander ................... | 345/348 |
| 5,982,753 A | * | 11/1999 | Pendleton et al. ........... | 370/252 |
| 6,054,984 A | | 4/2000 | Alexander ................... | 345/339 |
| 6,137,782 A | | 10/2000 | Sharon et al. ............... | 370/255 |
| 6,201,384 B1 | | 3/2001 | Alexander ............... | 324/121 R |
| 6,246,408 B1 | | 6/2001 | Alexander ................... | 345/348 |
| 6,253,240 B1 | | 6/2001 | Axberg et al. ............... | 709/223 |
| 6,314,460 B1 | | 11/2001 | Knight et al. ................ | 709/220 |
| 6,326,986 B1 | | 12/2001 | Alexander ................... | 345/764 |
| 6,327,544 B1 | | 12/2001 | Samuels ...................... | 702/70 |
| 6,363,384 B1 | | 3/2002 | Cookmeyer, II et al. ..... | 707/10 |
| 6,396,517 B1 | | 5/2002 | Beck et al. .................. | 345/771 |
| 6,397,359 B1 | | 5/2002 | Chandra et al. ............. | 714/712 |
| 6,473,407 B1 | * | 10/2002 | Ditmer et al. ............... | 370/252 |
| 6,515,968 B1 | * | 2/2003 | Combar et al. .............. | 370/252 |

FOREIGN PATENT DOCUMENTS

| | | | |
|---|---|---|---|
| WO | 96/13107 | 5/1996 | ........... H04L/12/26 |
| WO | 97/04394 | 2/1997 | ........... G06F/12/14 |
| WO | 97/31441 | 8/1997 | ............. H04J/3/02 |
| WO | 00/05594 | 2/2000 | ........... G01R/31/08 |
| WO | 00/31963 | 6/2000 | .......... H04N/1/413 |
| WO | 00/39696 | 7/2000 | ......... G06F/15/173 |
| WO | 00/39697 | 7/2000 | ......... G06F/15/173 |

OTHER PUBLICATIONS

Network Associates, Expert Sniffer® Network Analyzer Operations Release 5.50, Mar. 1998.

* cited by examiner

*Primary Examiner*—Min Jung
(74) *Attorney, Agent, or Firm*—Silicon Valley IP Group, PC; Kevin J. Zilka; Christopher J. Hamaty

(57) ABSTRACT

A graphical user interface is provided for displaying network analysis including a window including a plurality of gauges selected from the group consisting of a first gauge for indicating a number of packets specified by the network analysis, a second gauge for indicating a network utilization specified by the network analysis, and a third gauge for indicating a number of errors specified by the network analysis.

18 Claims, 32 Drawing Sheets

| Raw (10B) | Decoded (8B) | R/D | RD | Decode | Count hh:mm:ss.mmm.uuu.nnn |
|---|---|---|---|---|---|
| 001111 1010 | | K28.5 | − | IDLE 2 | 0:00:00.000.000.160 |
| 100100 0101 | 50 | D16.2 | + | | 0:00:00.000.000.168 |
| 001111 1010 | | K28.5 | − | IDLE 2 | 0:00:00.000.000.176 |
| 100100 0101 | 50 | D16.2 | + | | 0:00:00.000.000.184 |
| 001111 1010 | | K28.5 | − | IDLE 2 | 0:00:00.000.000.192 |
| 100100 0101 | 50 | D16.2 | + | | 0:00:00.000.000.200 |
| 001111 1010 | | K28.5 | − | | 0:00:00.000.000.208 |
| 100100 0101 | 50 | D16.2 | + | | 0:00:00.000.000.216 |
| 001111 1010 | | K28.5 | − | | 0:00:01.988.508.896 |
| 011000 1011 | 00 | D0.0 | + | | 0:00:01.988.508.904 |
| 001111 1010 | | K28.5 | − | Link_Config 2 42,42 | 0:00:01.988.508.912 |
| 110000 0101 | 42 | D2.2 | + | | 0:00:01.988.508.920 |
| 101101 0101 | 00 | D0.0 | − | | 0:00:01.988.508.928 |
| 011000 1011 | 00 | D0.0 | + | | 0:00:01.988.508.936 |
| 011000 1011 | 00 | D0.0 | + | Link_Config 1 B5,B5 | 0:00:01.988.508.944 |
| 110000 0101 | B5 | K28.5 | − | | 0:00:01.988.508.952 |
| 101010 1010 | 00 | D21.5 | + | | 0:00:01.988.508.960 |
| 100111 0100 | | D0.0 | − | | |

Fig. 8

| Raw (10B) | Decoded (8B) | K/D | RD | decode | count | hh:mm:ss.mmm.uuu:nnn |
|---|---|---|---|---|---|---|
| 100111 0001 | E0 | D0.7 | | – | | 0:00:05.679.223.072 |
| 100111 0100 | 00 | D0.0 | | – | | 0:00:05.679.223.079 |
| 001111 1010 | B5 | K28.5 | | + | Link_Config 1 B5,B5 | 0:00:05.679.223.087 |
| 101010 1010 | B5 | D21.5 | | + | | 0:00:05.679.223.095 |
| 011000 1110 | E0 | D0.7 | | – | | 0:00:05.695.997.344 |
| 011000 0101 | 40 | D0.2 | | + | | 0:00:05.695.997.352 |
| 001111 1010 | B5 | K28.5 | | + | Link_Config 2 42,42 | 0:00:05.695.997.359 |
| 010010 0101 | 42 | D2.2 | | – | | 0:00:05.695.997.367 |
| 100111 0001 | E0 | D0.7 | | – | | 0:00:05.695.997.376 |
| 100111 0101 | 40 | D0.2 | | + | | 0:00:05.695.997.383 |
| 110000 0101 | B5 | K28.5 | | + | Link_Config 1 B5,B5 | 0:00:05.695.997.391 |
| 101010 1010 | B5 | D21.5 | | + | | 0:00:05.695.997.399 |
| | | | | | | 0:00:05.695.997.408 |
| | | | | | | 0:00:05.695.997.415 |
| | | | | | | 0:00:05.695.997.423 |
| | | | | | | 0:00:05.695.997.431 |
| | | | | | | 0:00:05.695.997.440 |

Fig. 5k

| Raw (10B) | Decoded (8B) | K/D | RD | Decode | Count | hh:mm:ss:mmm:uuu:nnn |
|---|---|---|---|---|---|---|
| 001111 1010 | | K28.5 | − | | | 0:00:06.896.022.496 |
| 010010 0101 | 42 | D2.2 | + | | | 0:00:06.896.022.504 |
| 100111 0001 | E0 | D0.7 | − | Link_Config 2 E0,40 | | 0:00:06.896.022.512 |
| 100111 0101 | 40 | D0.2 | − | | | 0:00:06.896.022.519 |
| 110000 0101 | | K28.5 | + | | | 0:00:06.896.022.528 |
| 101010 1010 | B5 | D21.5 | − | Link_Config 1 E0,40 | | 0:00:06.896.022.536 |
| 100111 0001 | E0 | D0.7 | − | | | 0:00:06.896.022.544 |
| 100111 0101 | 40 | D0.2 | − | | | 0:00:06.896.022.551 |
| | | | | | | 0:00:06.896.022.560 |
| | | | | | | 0:00:06.896.022.568 |
| | | | | | | 0:00:06.896.022.576 |
| | | | | | | 0:00:06.896.022.583 |
| 110000 0101 | | K28.5 | + | IDLE 1 | | 0:00:06.912.799.424 |
| 101001 0110 | C5 | D5.6 | + | | | 0:00:06.912.799.431 |
| 001111 1010 | | K28.5 | + | IDLE 2 | | 0:00:06.912.799.439 |
| 100100 0101 | 50 | D16.2 | + | | | 0:00:06.912.799.447 |
| 001111 1010 | | K28.5 | − | IDLE 2 | | 0:00:06.912.799.456 |

GRAPHICAL USER INTERFACE SYSTEM AND METHOD FOR VISUALLY GAUGING NETWORK PERFORMANCE

This is a continuation of Application No. 09/440,804, filed Nov. 15, 1999.

FIELD OF THE INVENTION

The present invention relates to the field of computer networks. In particular, the present invention relates to a system, computer program product and method for analyzing handshake protocols for the physical link layer of a computer network.

BACKGROUND OF THE INVENTION

Network protocol analyzers are widely used to monitor computer network performance and assist users in analyzing the causes of network slowdowns or outages. Protocol analyzers assist in explaining possible causes for network problems, collect expert analysis data automatically, learn network configurations continuously, show breakdown of network protocol activity automatically, display network errors, frame size, and station statistics, enable creation and generation of management reports, consolidate information from remote sites at a central location, point out problems proactively by communicating alarms to a central location, and display multiple windows concurrently allowing a service person to view prioritized alarms, global statistics, traffic statistics, and expert analysis information from one or several servers simultaneously. An exemplary protocol analyzer is the Sniffer Pro 3.0 currently available from Network Associates, Inc, described in the user's manuals for the Sniffer Pro 3.0® and Sniff master® for Windows, the contents of which are hereby incorporated by reference. Protocol analyzers are described in various white papers, available at Network Associate's website, http://www.nai.com, and specifically at the webpage http://www.nai.com/asp_set/buy_try/try/whitepapers.asp, hereby incorporated by reference as of the filing date of this application.

FIG. 1 is a diagram of an exemplary enterprise network 100, comprising a plurality of local area networks 104,106, 108 and 110. Local area networks 104, 106 and 110 are connected via routers 132 and 134. Local area network 108 is a remote network coupled to the remaining network through the Internet 112 and gateway devices 114 and 116. The network 100 includes a protocol analysis server 140, and protocol analysis agent computers 148, 150 and 152, to provide monitoring and troubleshooting information for the entire network 100. Protocol analysis software, such as the Sniffer Pro 3.0, loads onto protocol analysis server 140 and may also comprise remote agents that are loaded onto the protocol analysis agent computers 148, 150, and 152. The protocol analysis software compiles and displays information on network activity from the data-collecting protocol analysis agent computers 148, 150, and 152.

For many network topologies, including Gigabit Ethernet, communication requires establishing a point-to-point link— that is, the link at the physical layer. To establish this link, the two devices attempting to communicate go through a training and negotiation process until an agreement is reached on parameters for communication. If no agreement is reached within some reasonable period (on the order of several seconds), or an error condition occurs, the attempt to establish a link has failed.

An example of this process for Gigabit Ethernet is shown in FIG. 2. At time t0, node 1 initiates the training and negotiation process by sending information in the form of an "auto-negotiation ordered set" to node 2. The auto-negotiation ordered set is the physical link layer handshake protocol control packet used for Gigabit Ethernet. An auto-negotiation ordered set includes of several copies of an auto-negotiation configuration register value, reg_value, transmitted with alternating headers. The two alternating headers are /C1/and /C2/, consist of two ten-bit codes, and signify that what follows is an auto-negotiation configuration register value. The register value is conveyed by two 10-bit codes, which are converted to two eight-bit words corresponding to hexadecimal characters. The register value consists thus consists of one sixteen bit word. The individual bits in the sixteen-bit word have meanings defined by the protocol standard, indicating the various capabilities of the sending node. The receiving node responds at time t1 with its own auto-negotiation configuration register value, indicating its own capabilities, along with an acknowledgment.

The two nodes continue to modify their requirements, as reflected in the auto-negotiation configuration register value, until an agreement is reached. When a node receives an acceptable auto-negotiation configuration register value from the other node, the node transmits an "IDLE" signal. When both nodes transmit "IDLE" signals an agreement has been reached and frames may be sent. Details of the auto-negotiation process, the ten-bit to eight-bit conversion, and the register values for Gigabit Ethernet are described in the IEEE 802.3z standard, the contents of which are hereby incorporated by reference into the present application.

Prior art protocol analyzers are directed primarily to gathering and analyzing information relating to data transmission—that is, the frames of data exchanged by the various devices attached to the network. Efforts to establish the physical layer link are not traditionally visible to users. As shown in FIG. 3, the protocol analyzer does not begin capture 303 or analysis 304 until after a link is established 302. Until the link is established 302, no frames of data can be exchanged. For relatively low-speed communication protocols, establishing a link is usually not problematic, because the technology for low-speed links is mature.

However, for some high-speed topologies such as Gigabit Ethernet, many network failures occur during attempts to establish a link. For example, one device may have communication requirements that are incompatible with another device, or a device may not modify its requirements appropriately in order to reach an agreement. Most prior art protocol analyzers fail to capture any information on the training and negotiation process, requiring the use of one or more logic analyzers to capture the information as digital waveforms, and extensive effort to decode the information. That is, the physical link layer handshake protocol control packets are not captured by these prior art protocol analyzers. Furthermore, those prior art protocol analyzers that do capture the physical link layer handshake protocol control, packet provide no merged information and no decoding or analysis, requiring a time-consuming process to troubleshoot the link failure. For example, as shown in FIG. 4, Version 2.5 of Network Associate's Sniffer Pro® protocol analyzer captures the auto-negotiation ordered sets 401 for each of the two channels between the two devices—one channel transmitting in each direction—and displays the raw binary and converted hexadecimal auto-negotiation ordered sets for each channel on a separate page 405, without merging the information for the two channels onto a single, time-ordered display. The auto-negotiation ordered sets for each channel are kept in the order in which they were sent 402 on separate displays for each channel. No decoding or analysis is provided for the auto-negotiation ordered sets—only for the frame data.

FIGS. 5a–5i are screen displays for Sniffer Pro v.2.5 corresponding to the process sown in FIG. 4. FIG. 5a is a screen display of the main menu, before the training and negotiation process is initiated. Neither channel is up, and the capture buffers are both empty. FIG. 5b is the help menu describing the various display capabilities. FIGS. 5c–5e show the sequentially-ordered auto-negotiation ordered sets 405 for channel 1, corresponding to node 1. The auto-negotiation register values and frame information are provided in hexadecimal in the first two columns, and decoding for the frame information and the idle signals is provided in the third column. The time stamps appear in the far right column.

The first auto-negotiation ordered set appears on FIG. 5c at timestamp 01:998:509:424, in units of seconds: milliseconds: microseconds: nanoseconds. The training and negotiation is complete and the link established 404 by timestamp 08:856:536:079, when channel 1 has transmitted several idles, and the start_of_frame is transmitted. FIGS. 5f–5h show the auto-negotiation ordered sets 403 in raw binary form. The raw binary information is provided in the first column, along with the corresponding 8 bit register values in hexadecimal in the second column—that is, the 8 bits is the hexadecimal value corresponding to a ten-bit code. The third column is the header information, which provides the name of the corresponding ten-bit code; the code may be either a control code or a data code. Corresponding hexadecimal and raw data for channel 2 is shown in FIGS. 5i–5l.

Once both channels are carrying the idle signal, the link is established 404 and frame data is captured 405. FIG. 5m shows frame data for channel one in hexadecimal form, and FIG. 5n shows decoded frame data 406. FIGS. 5o and 5p show hexadecimal and decoded frame data 406 for channel 2. Finally, FIG. 5q shows a merged view of the decoded frame data for both channels 406.

As shown in FIGS. 5a through 5q, decoding is provided only for the frame data and the idle state. The raw auto-negotiation ordered set data is converted from 10-bit to hexadecimal form, but no decoding—no bitwise explanation of the register value—is provided. Furthermore, although the frame data from both channels is merged, the auto-negotiation ordered sets for the two channels are not merged to facilitate analysis of a link failure. Instead, the auto-negotiation ordered sets for each channel are shown in a separate display. Thus, a user attempting to determine why the devices failed to establish a link, using the information provided in FIGS. 5c through 5l, must go through a tedious and time-consuming process. First, the user must combine the information from channel 1 and channel 2, locating the timestamps for each auto-negotiation ordered set, and putting the merged auto-negotiation ordered sets for both channels in sequential order. Then, for each auto-negotiation ordered set, the user must look up and decode the register value in a reference such as the IEEE 802.3z standard. This decoding must be distinguished from simply identifying the hexadecimal value corresponding to a ten-bit code: here, "decoding" means that the user must look up the meaning of each individual bit to determine the configuration represented by the register value. Finally, the user must analyze the sequence of events to determine the cause of the failure and identify a possible solution.

Accordingly, it would be desirable to provide a protocol analyzer which captures, merges, decodes, analyzes and displays information on the training and negotiation process used to establish a link—that is, the physical link layer handshake protocol control packets.

It would be further desirable to provide an function to determine the cause of a failure to establish a link, based on an analysis of the failure of the training and negotiation process.

SUMMARY OF THE INVENTION

A graphical user interface is provided for displaying network analysis including a window including a plurality of gauges selected from the group consisting of a first gauge for indicating a number of packets specified by the network analysis, a second gauge for indicating a network utilization specified by the network analysis, and a third gauge for indicating a number of errors specified by the network analysis.

BRIEF DESCRIPTION OF THE DRAWINGS

FIGS. 8a–8h show windows relating to the process shown in FIG. 7.

DETAILED DESCRIPTION OF THE INVENTION

Figure 1:
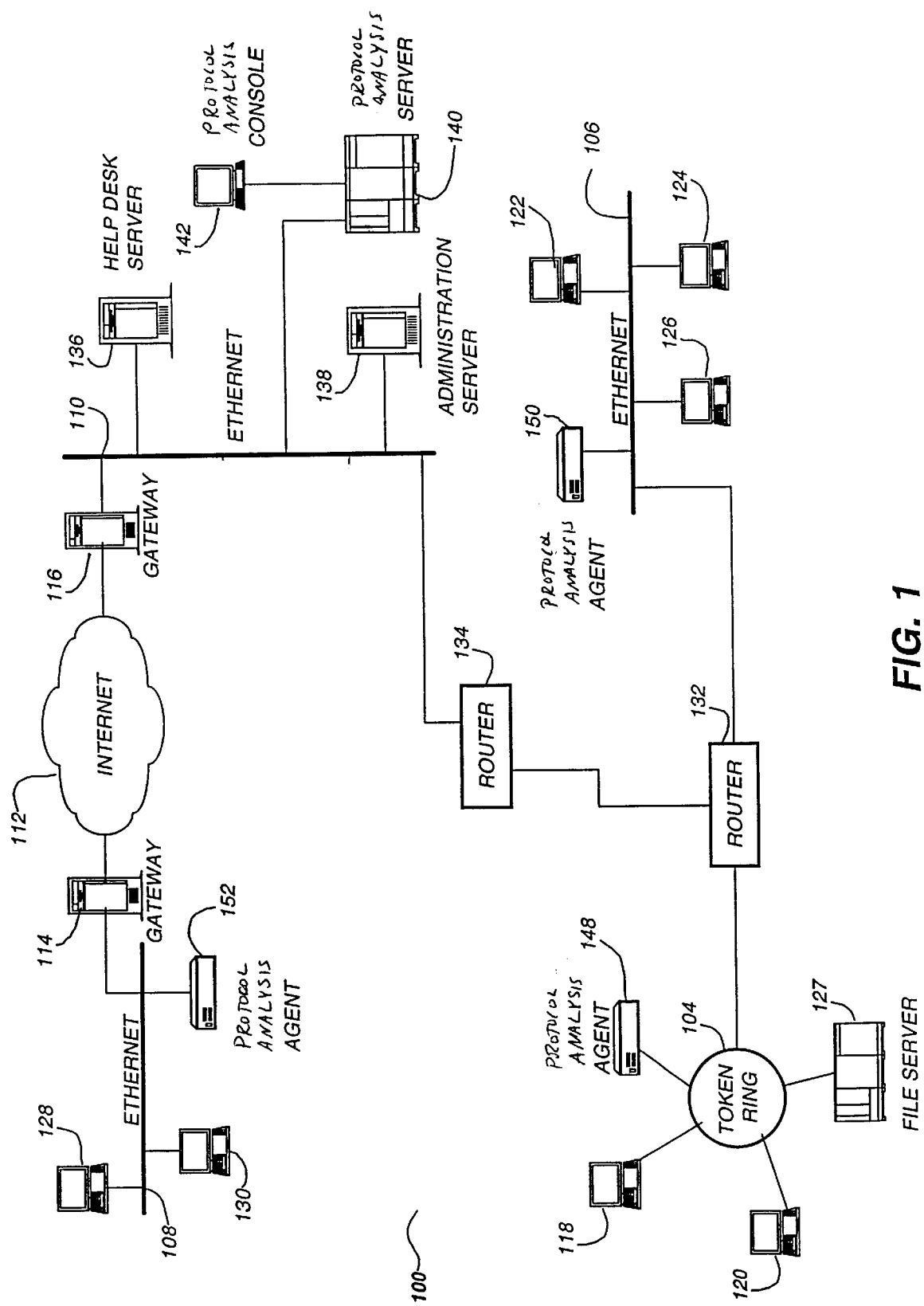
FIG. 1 is a diagram of a computer network.
Figure 2:
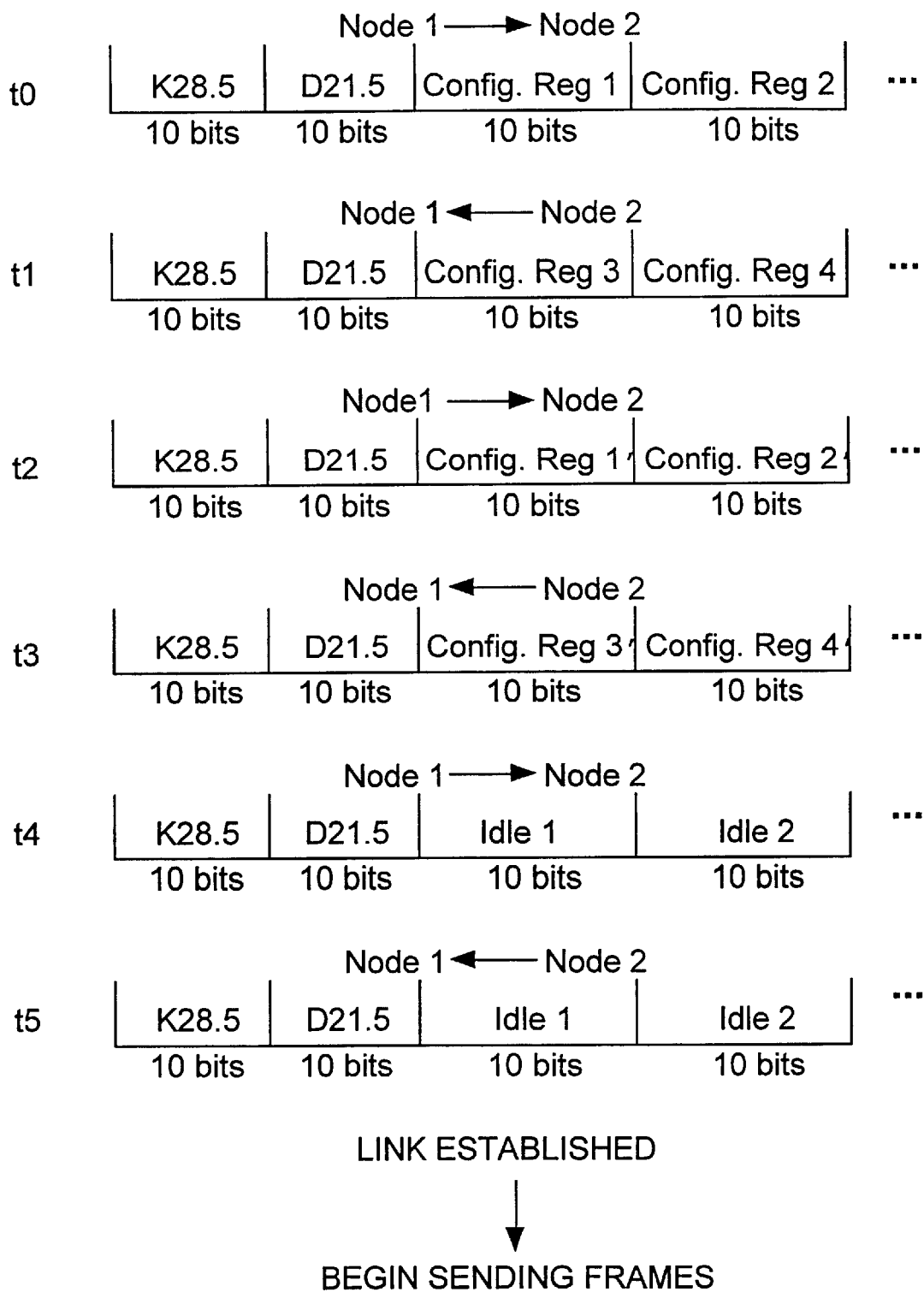
FIG. 2 shows a sequence of auto-negotiation ordered sets exchanged by two nodes attempting to establish a link.
Figure 3:
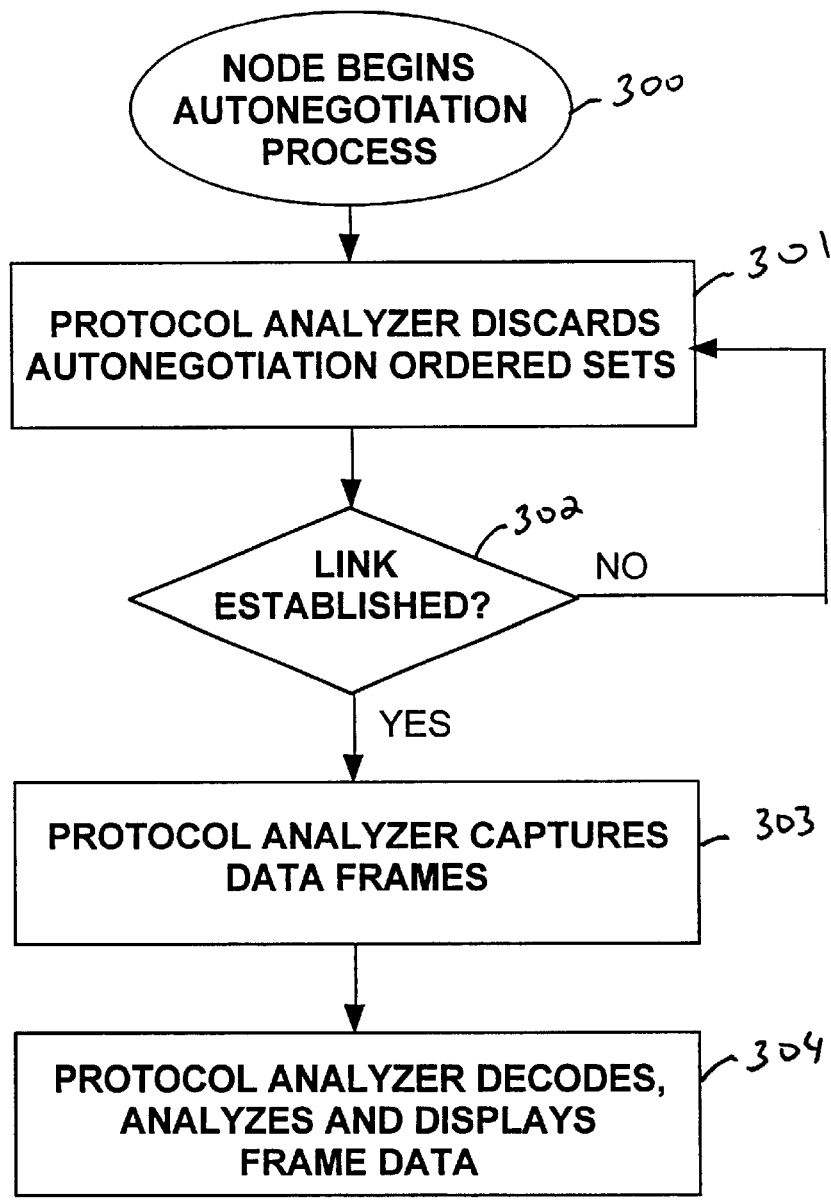
FIG. 3 shows the steps performed by a protocol analyzer in accordance with a first prior art approach.
Figure 4:
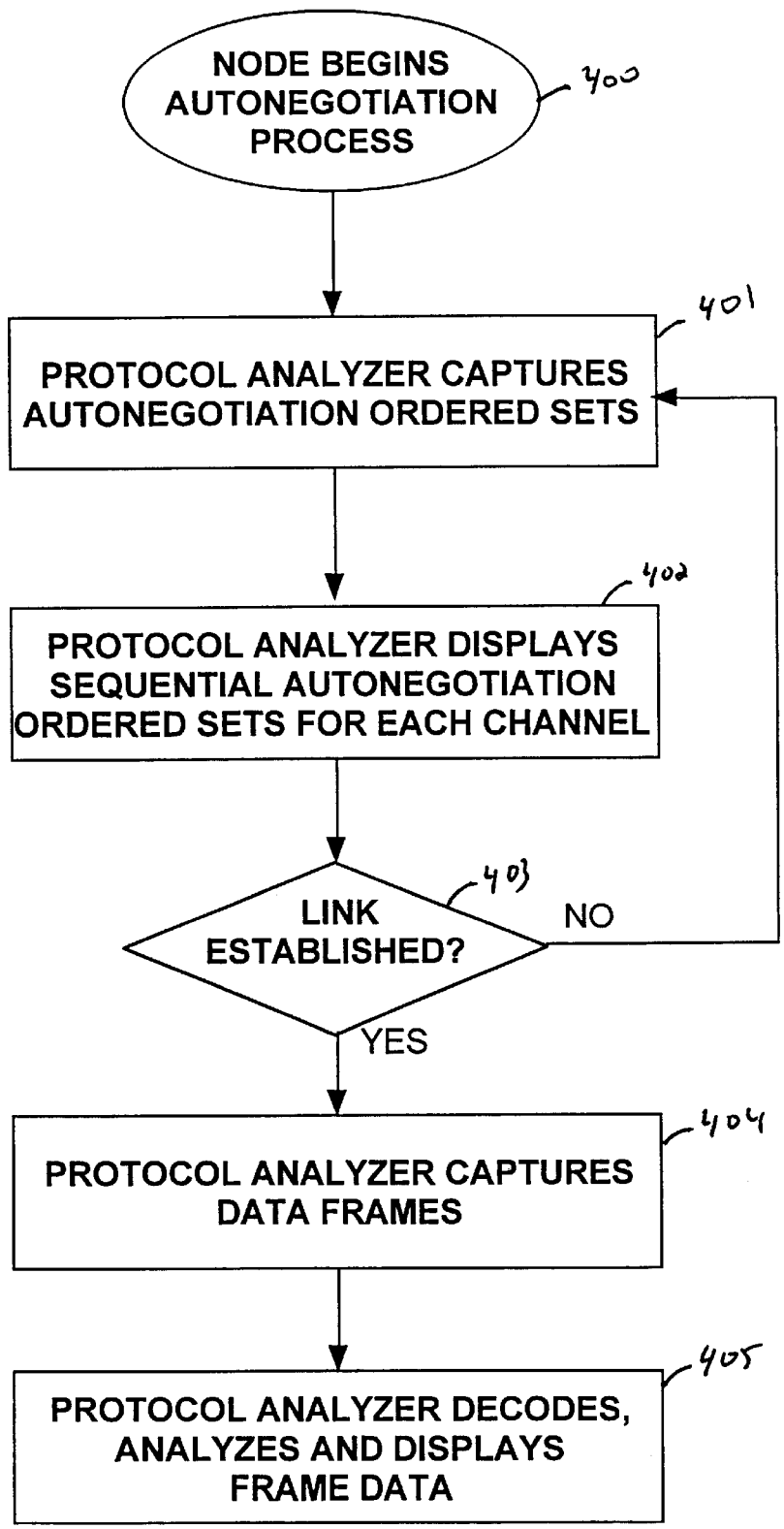
FIG. 4 shows the steps performed by a protocol analyzer in accordance with a second prior art approach.
Figure 5A:
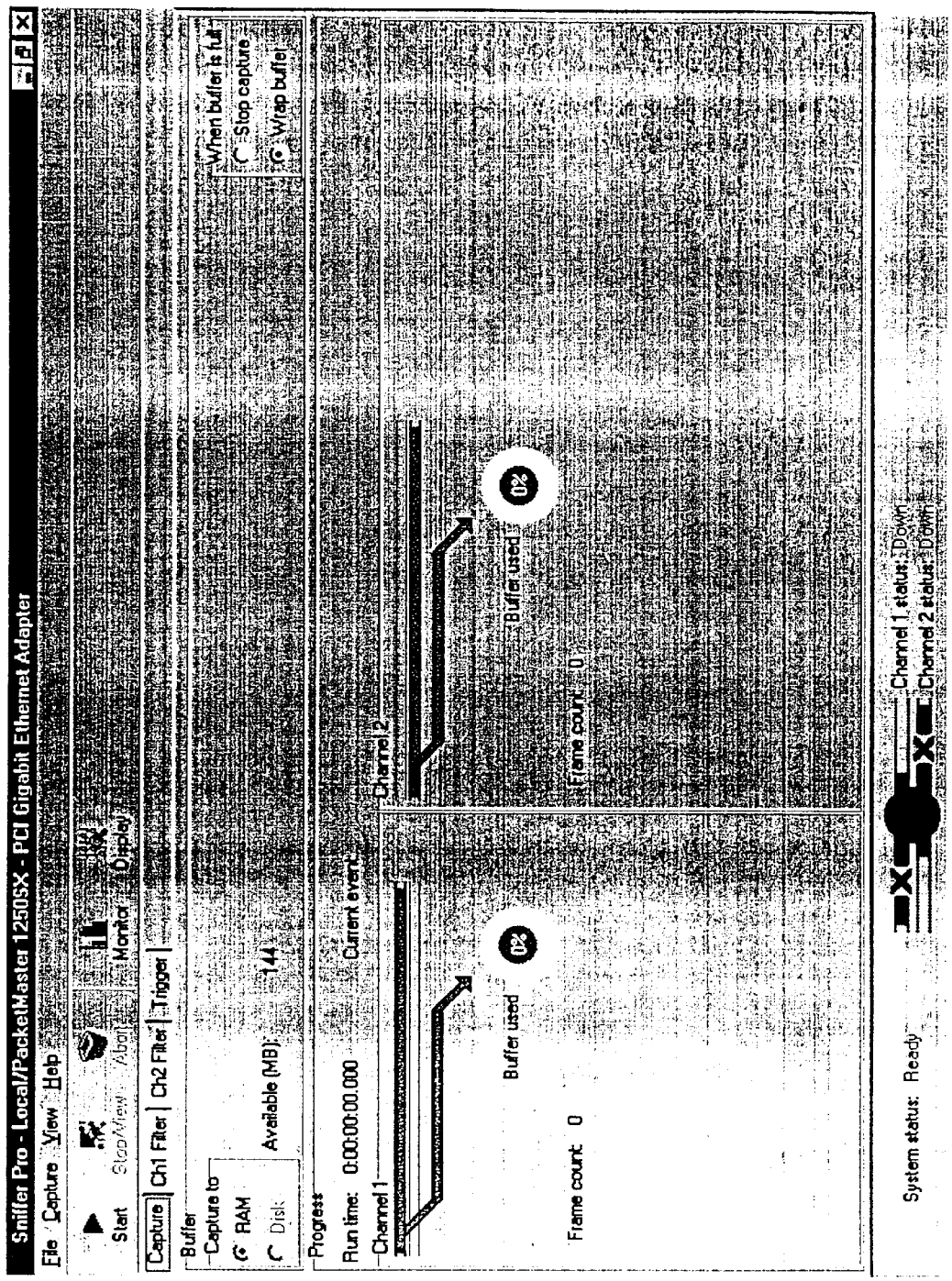
FIGS. 5a through 5q show windows relating to the process shown in FIG. 4.
Figure 5B:
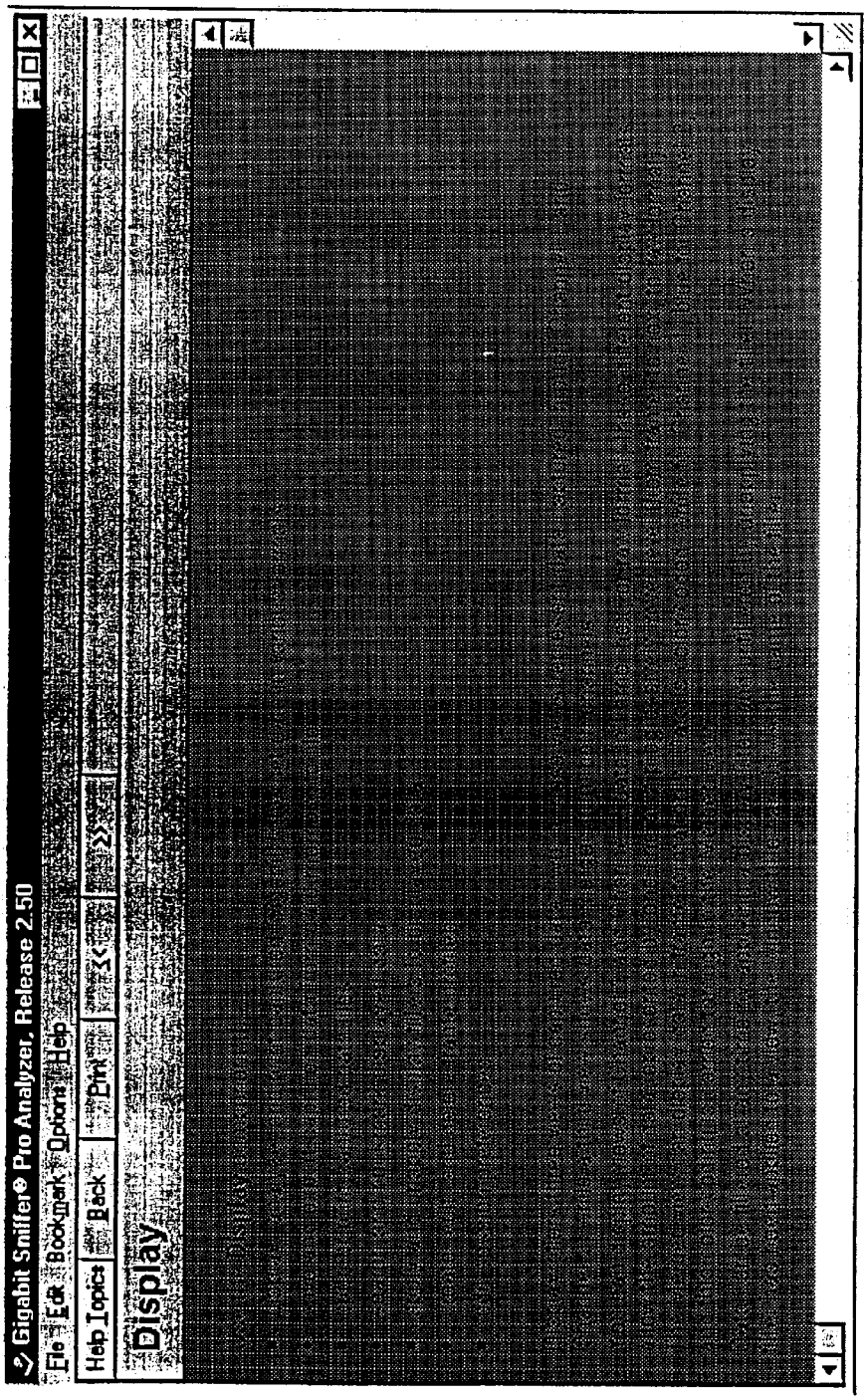
Figure 5C:
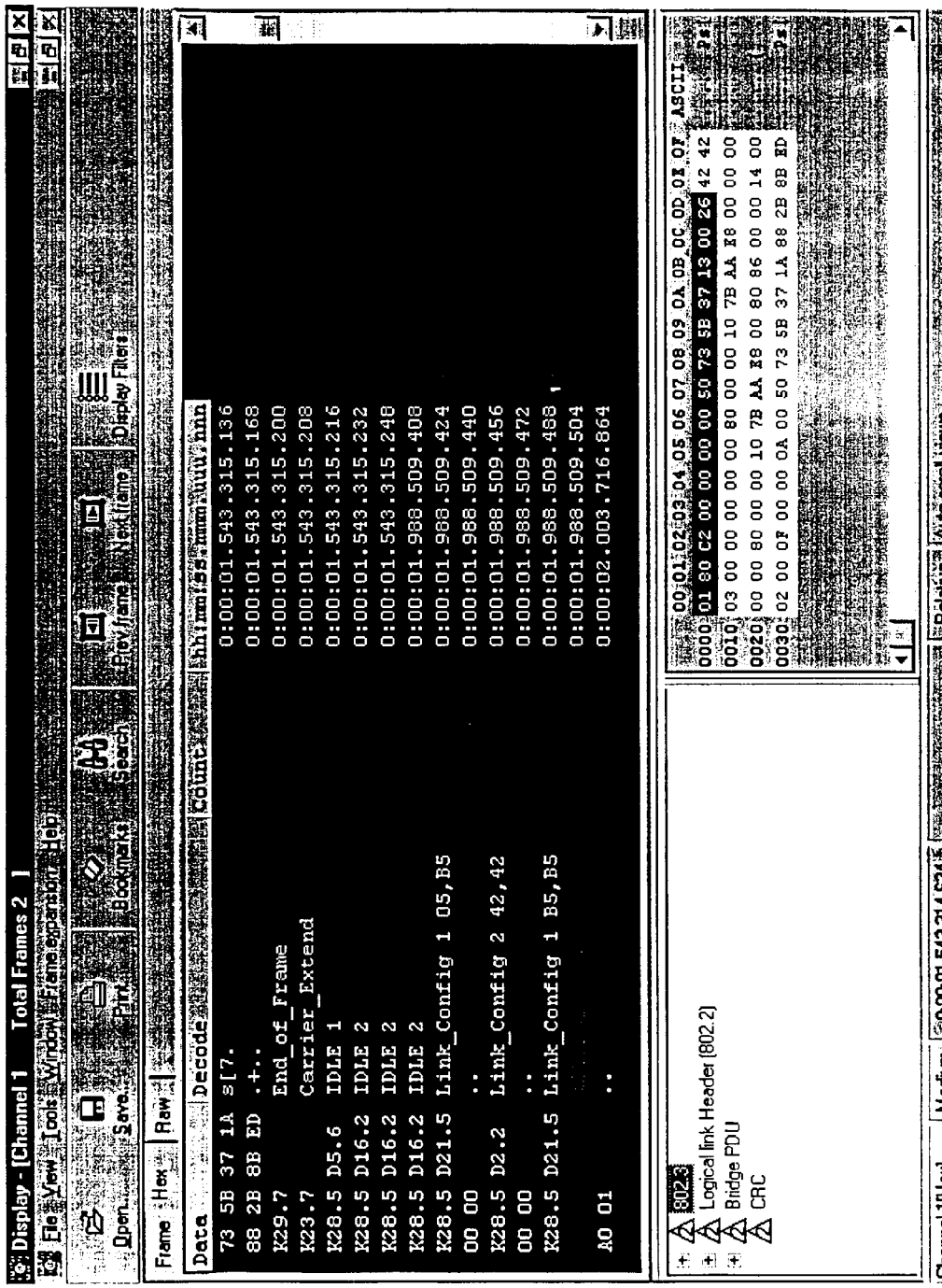
Figure 5D:
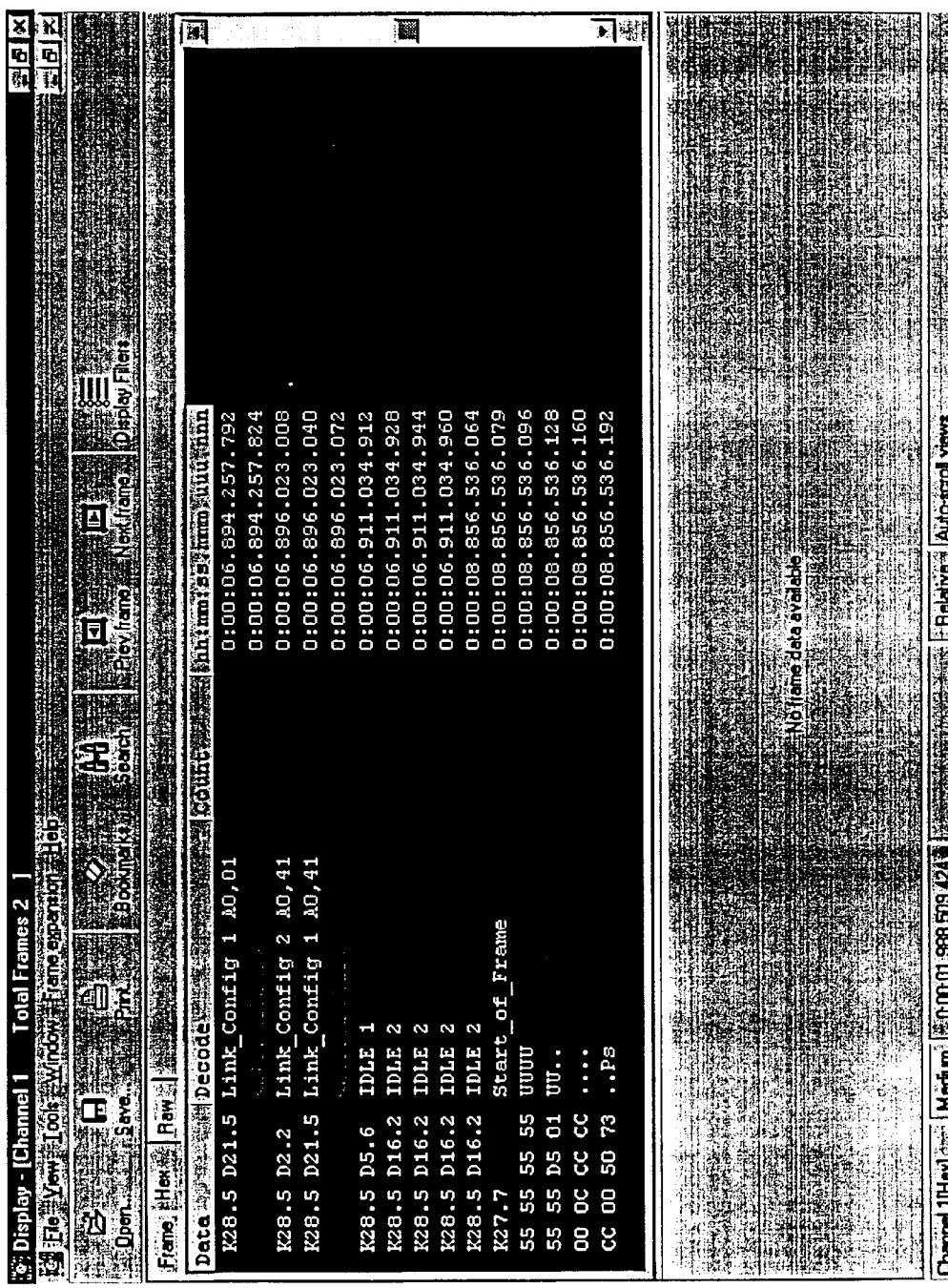
Figure 5E:
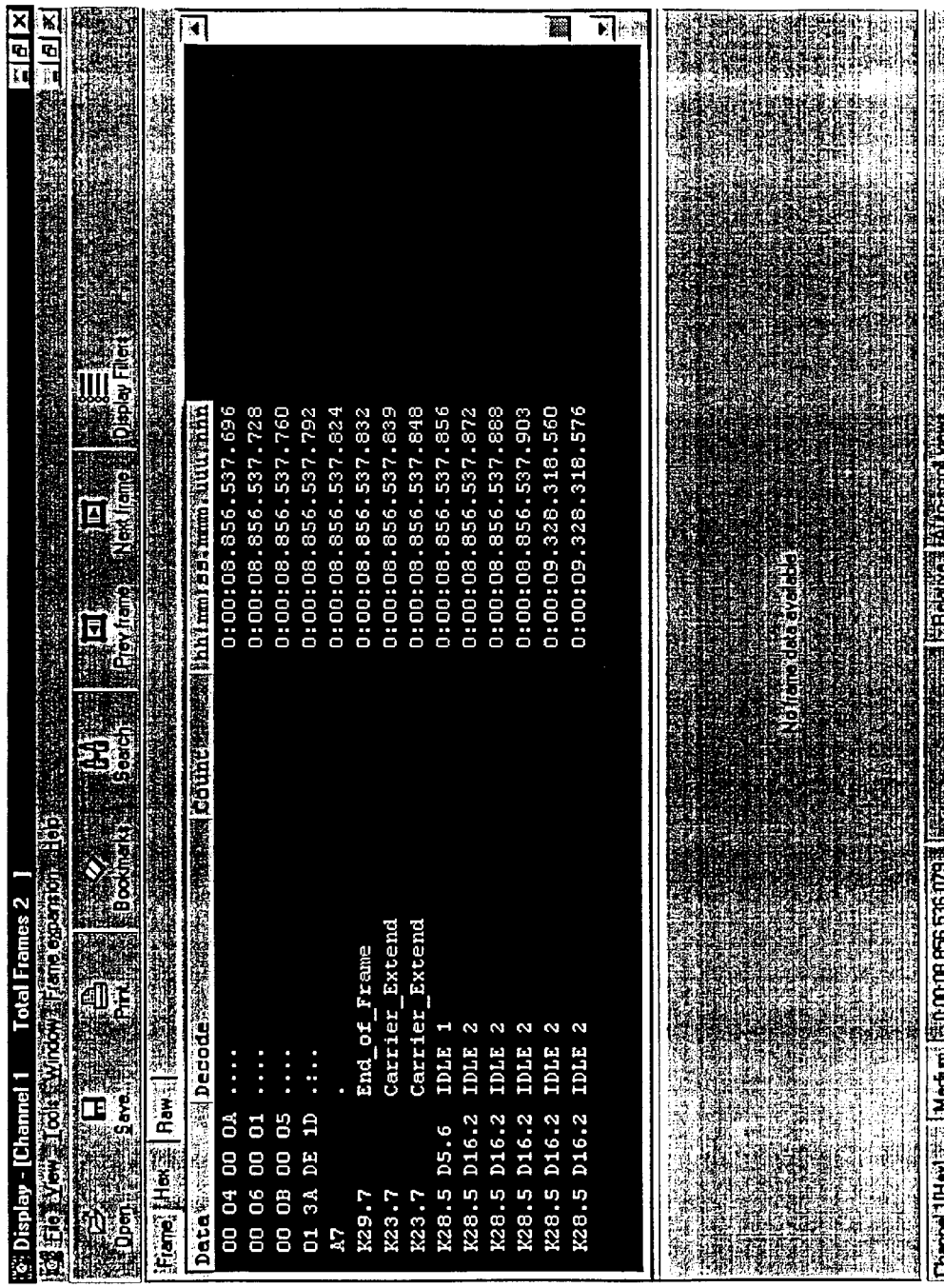
Figure 5F:
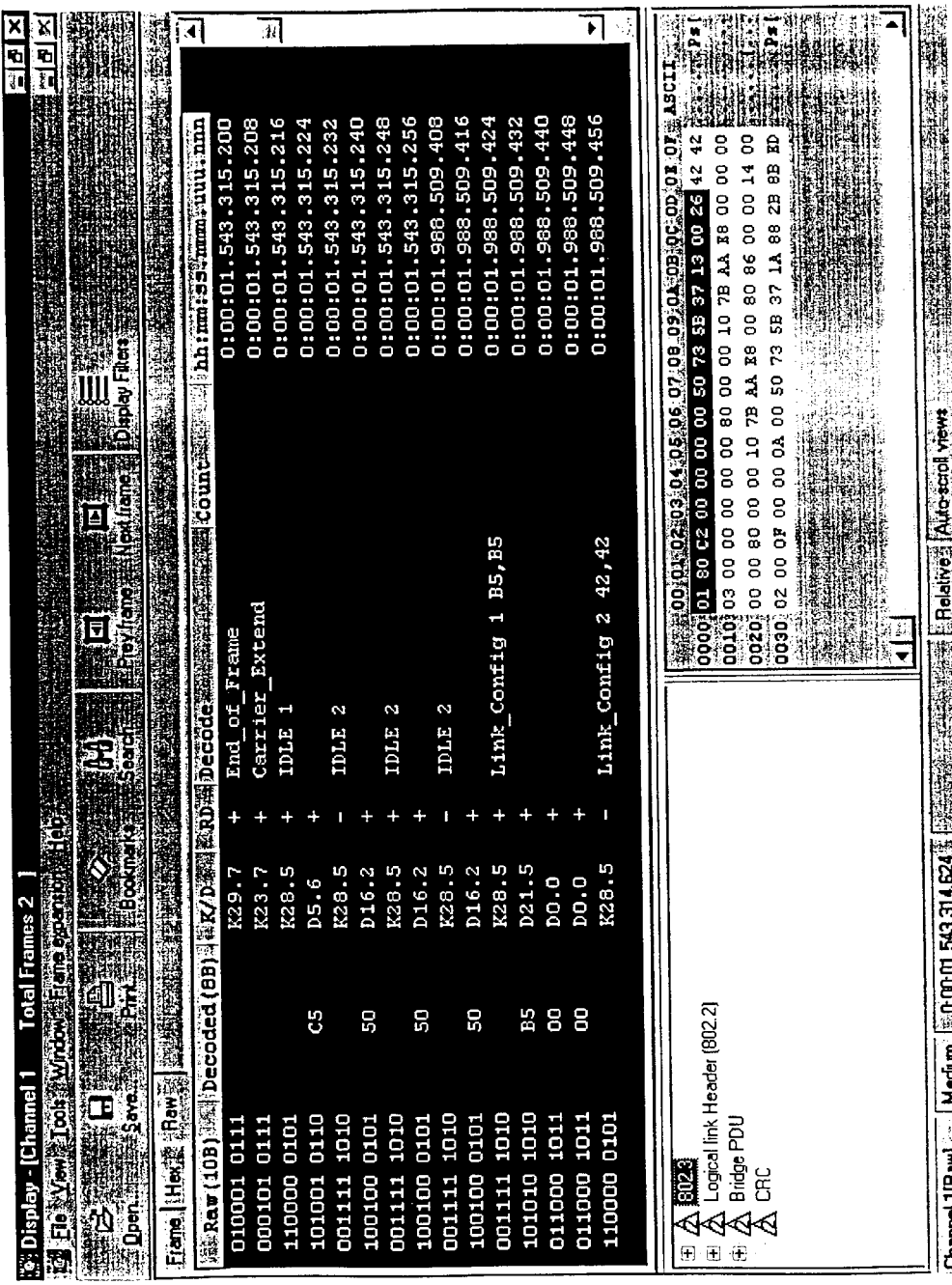
Figure 5G:
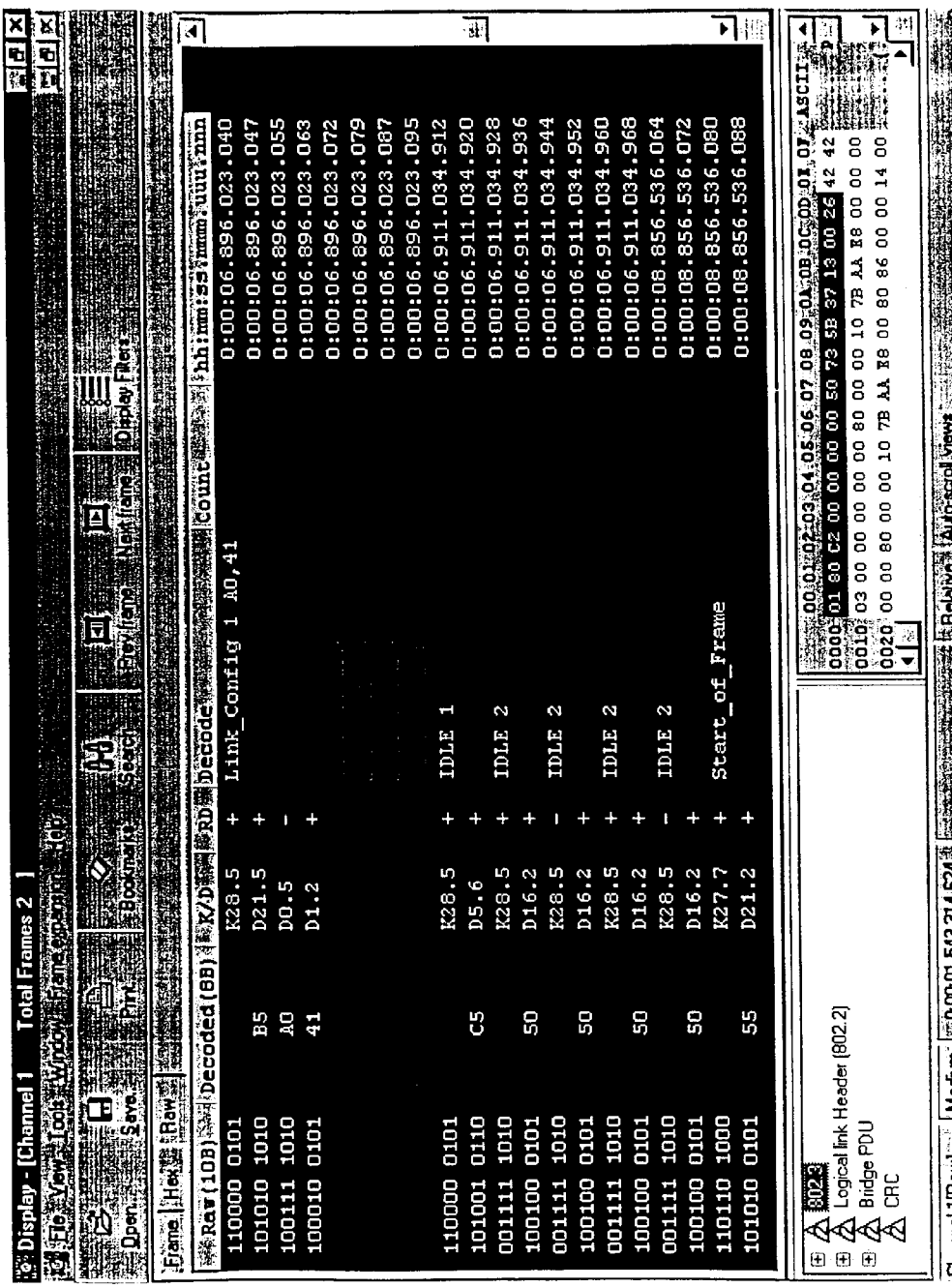
Figure 5H:
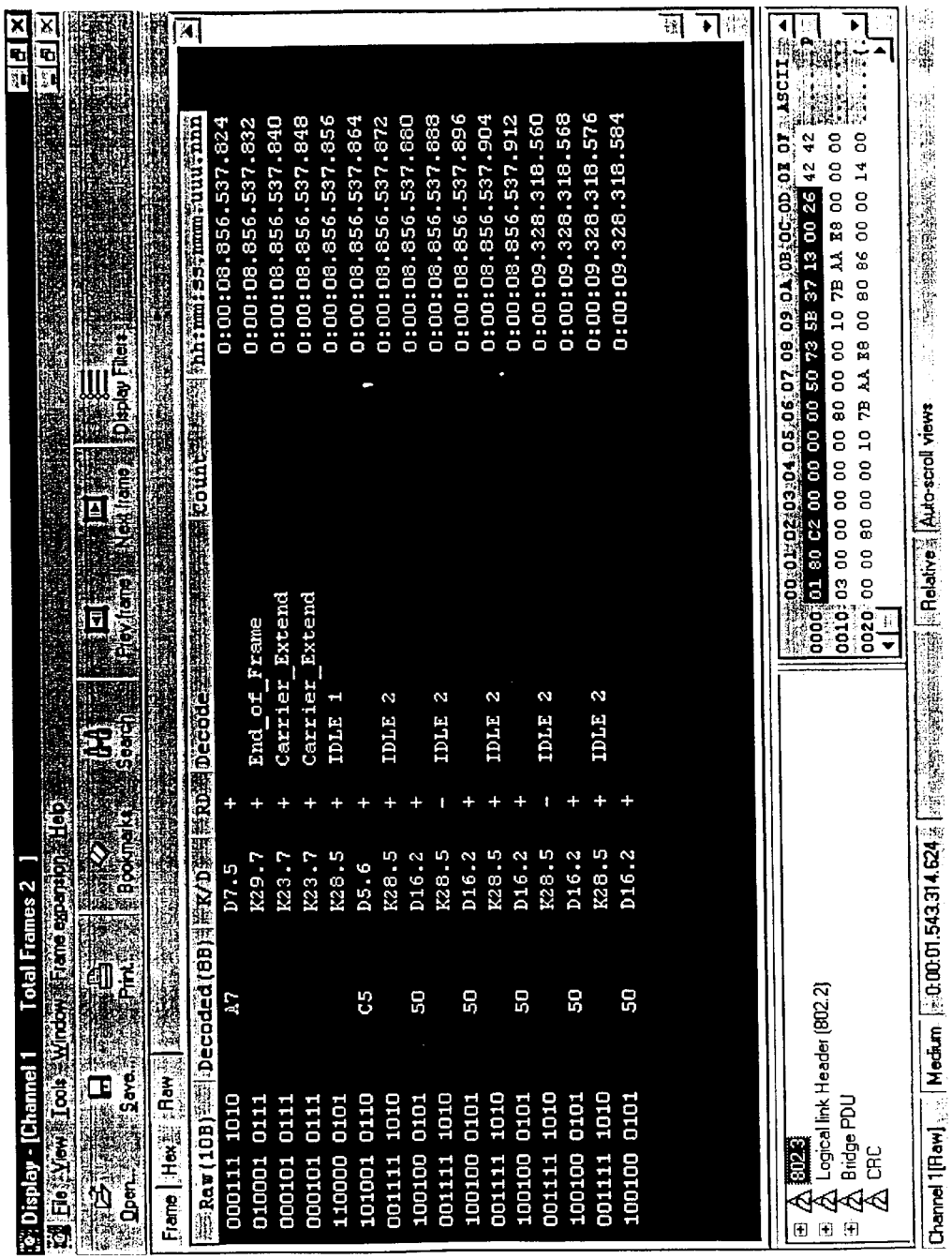
Figure 5I:
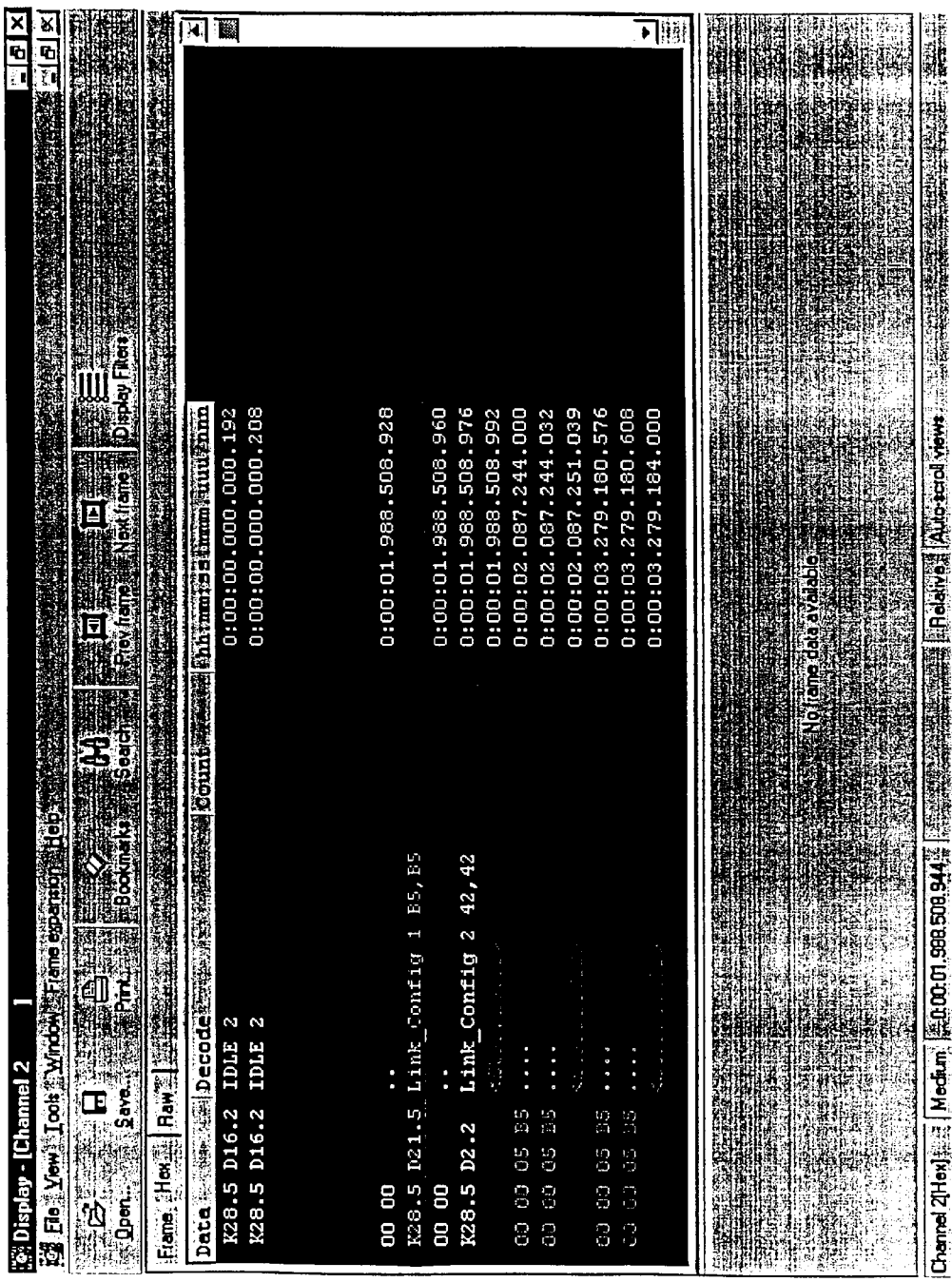
Figure 5M:
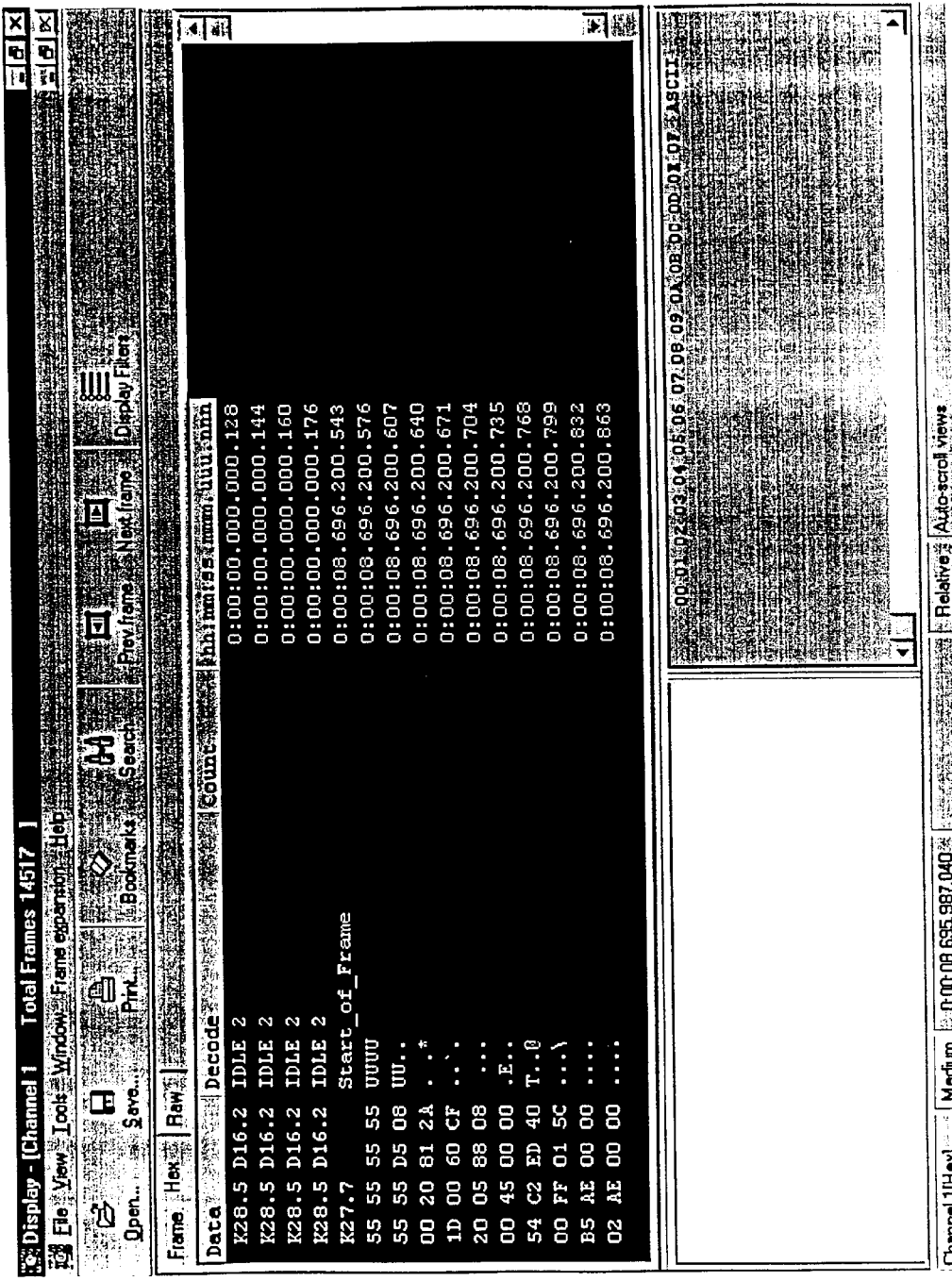
Figure 5A:
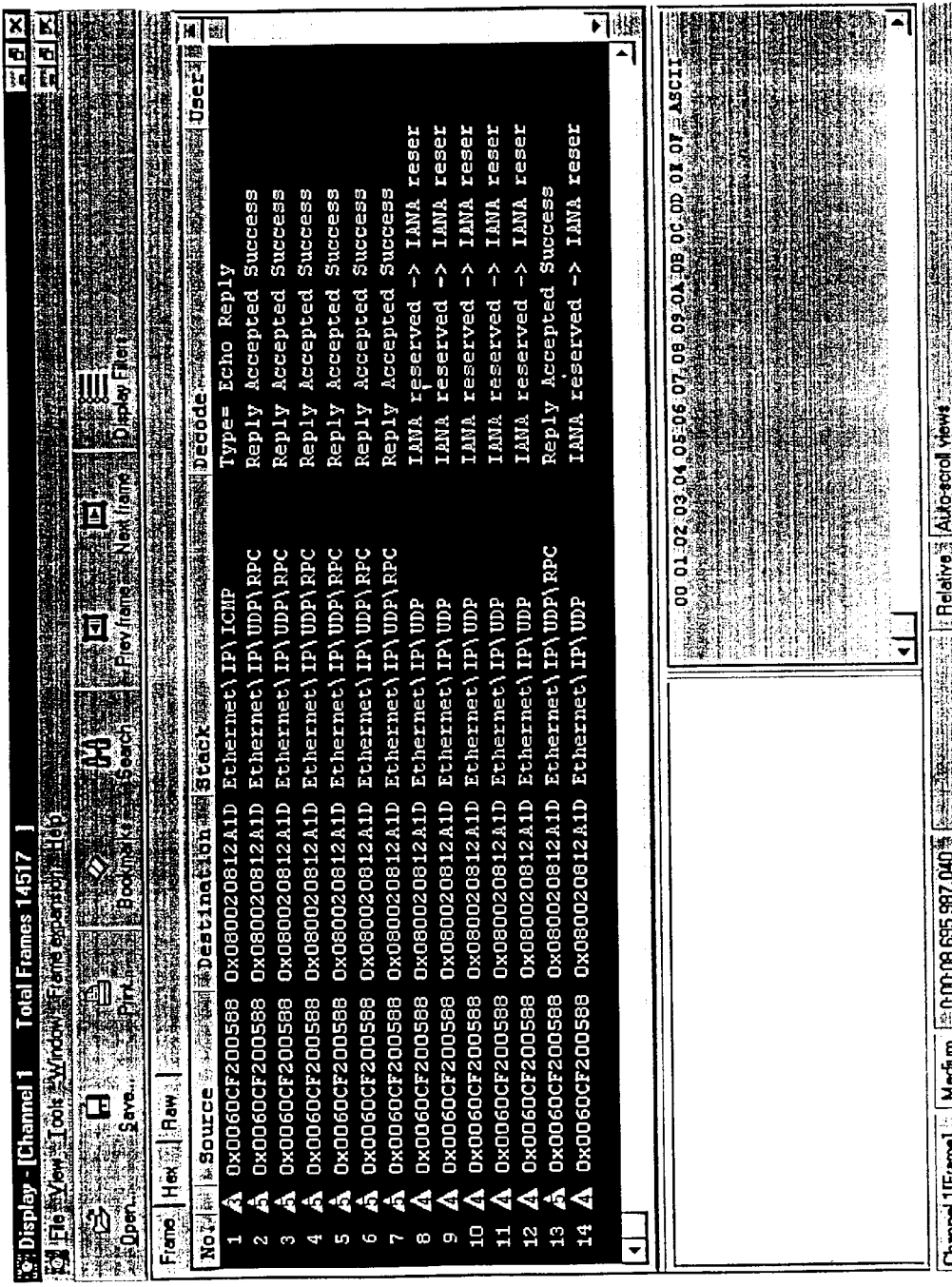
Figure 5P:
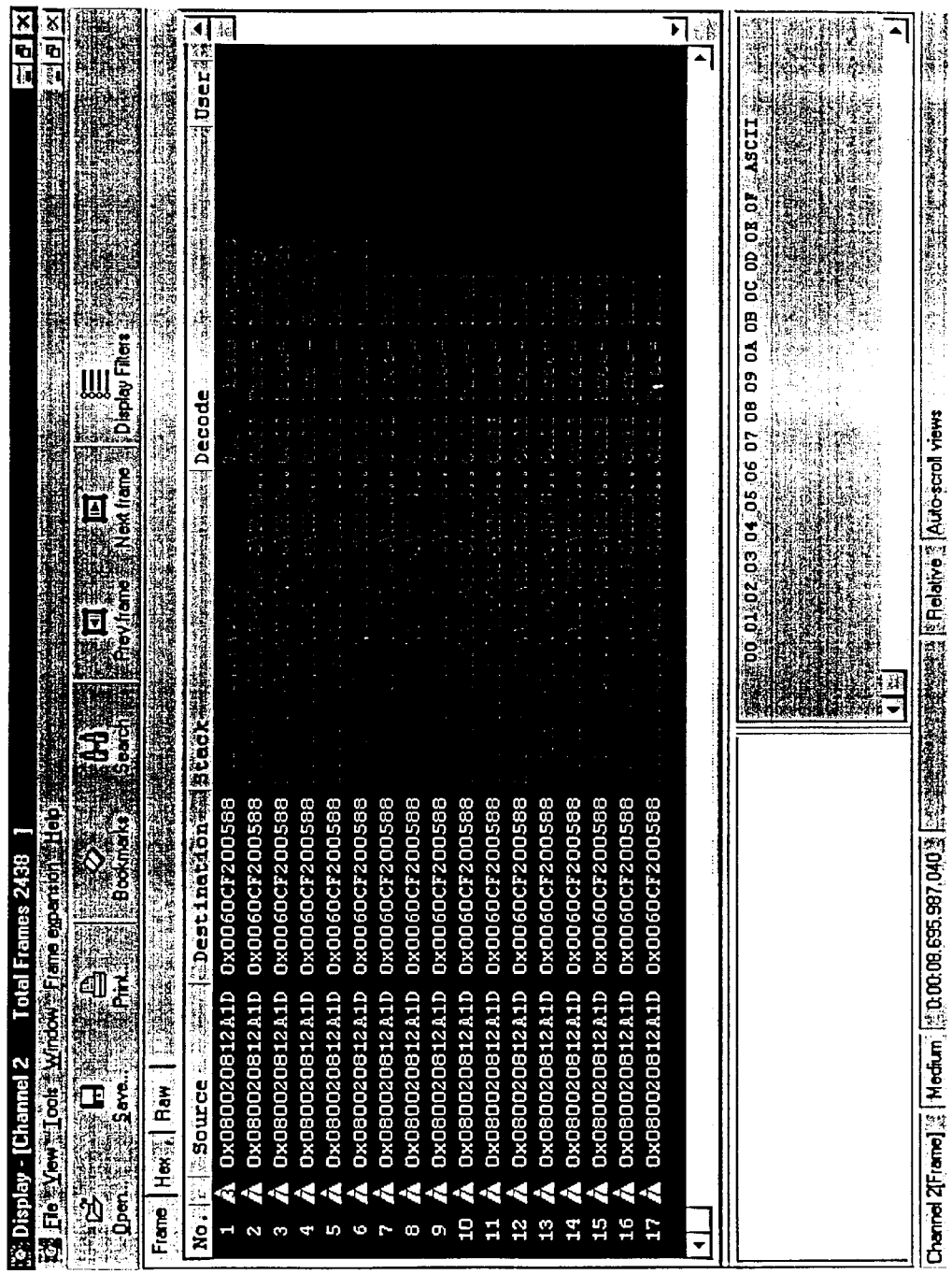
Figure 59:
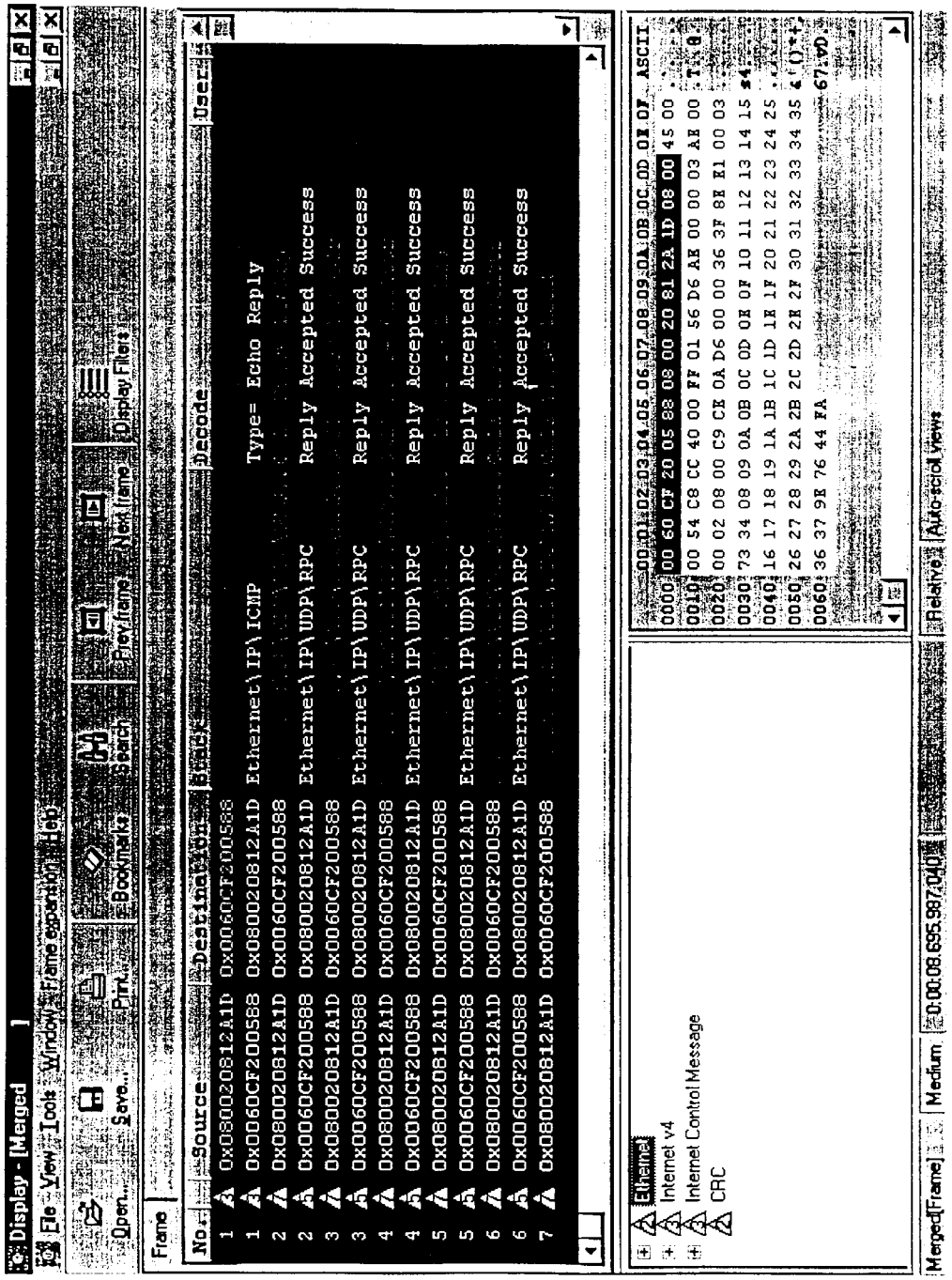
Figure 6:
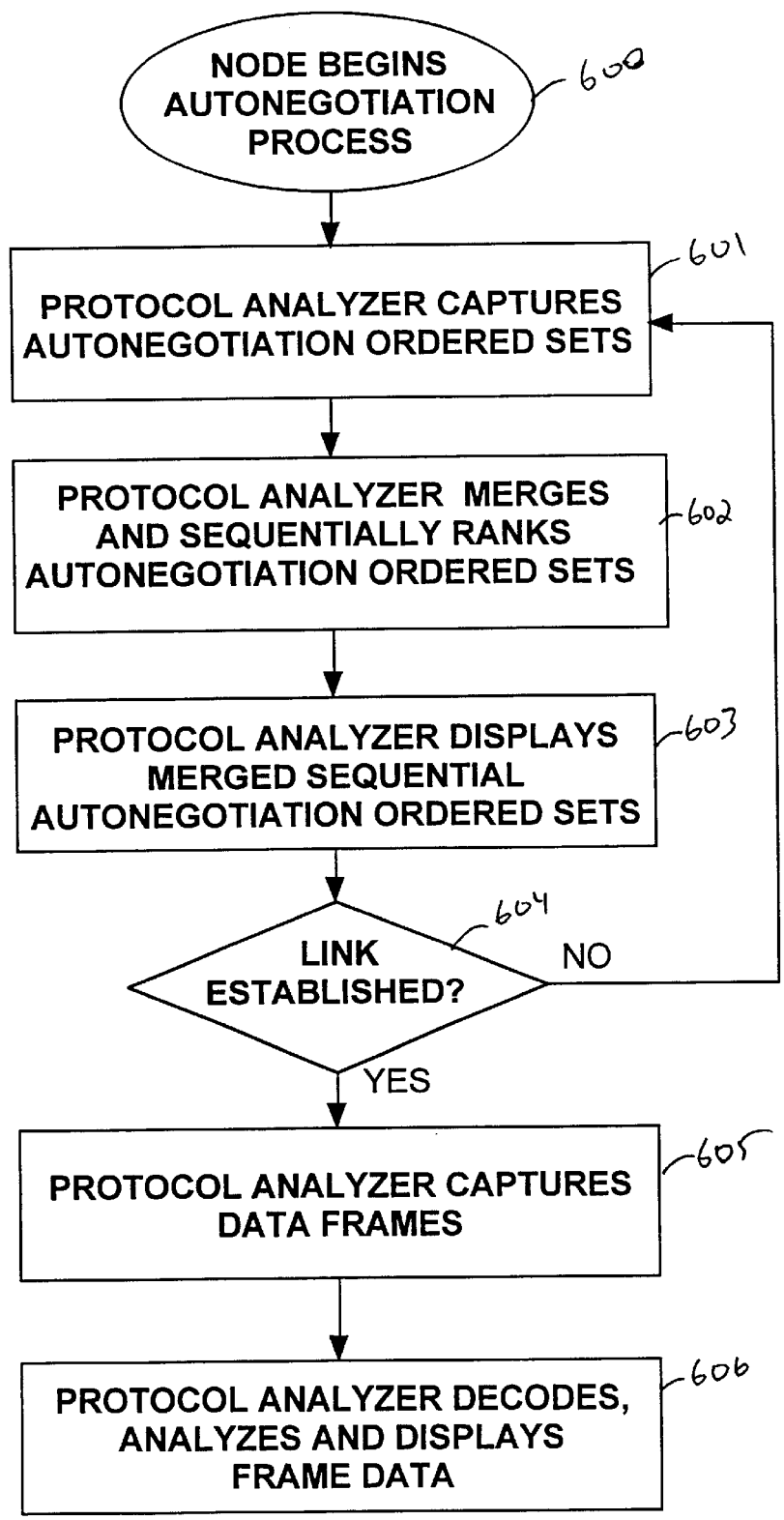
FIG. 6 shows the steps performed by a protocol analyzer in accordance with one embodiment of the invention.

FIG. 6 shows steps for creating a merged sequential list of the auto-negotiation ordered sets generated by two nodes attempting to establish a link over Gigabit Ethernet. One node, node 1, initiates the training and negotiation process 600 by sending an auto-negotiation ordered set over channel 1, to which the other node, node 2, eventually responds over channel 2. The protocol analyzer captures each auto-negotiation ordered set 601 in a hardware capture buffer for each channel. The protocol analyzer software then traverses the capture buffer of each channel, looking for timestamps which are followed by ten-bit codes carrying the codes /C1/ or /C2/. These codes translate to K28.5 or D21.5, for /C1/, and K28.5 or D2.2, for /C/1. The K prefix indicates that the code is a control code, and the D prefix indicates that the code is a data code. The software then parses the auto-negotiation ordered sets 602, using the algorithm that the smaller timestamp is selected first, and, if both timestamps have the same value, the auto-negotiation ordered set from channel 1 is selected first. The software continues to traverse the capture buffers and parse the auto-negotiation ordered sets, merging the auto-negotiated ordered sets based upon their timestamps, until either an idle code is seen on each channel, indicating that the link is established 604, or the buffer for each channel has been exhausted. It will be appreciated that a parsing algorithm based on criteria other than timestamps may also be used to create a merged list for troubleshooting a link failure.

Figure 7:
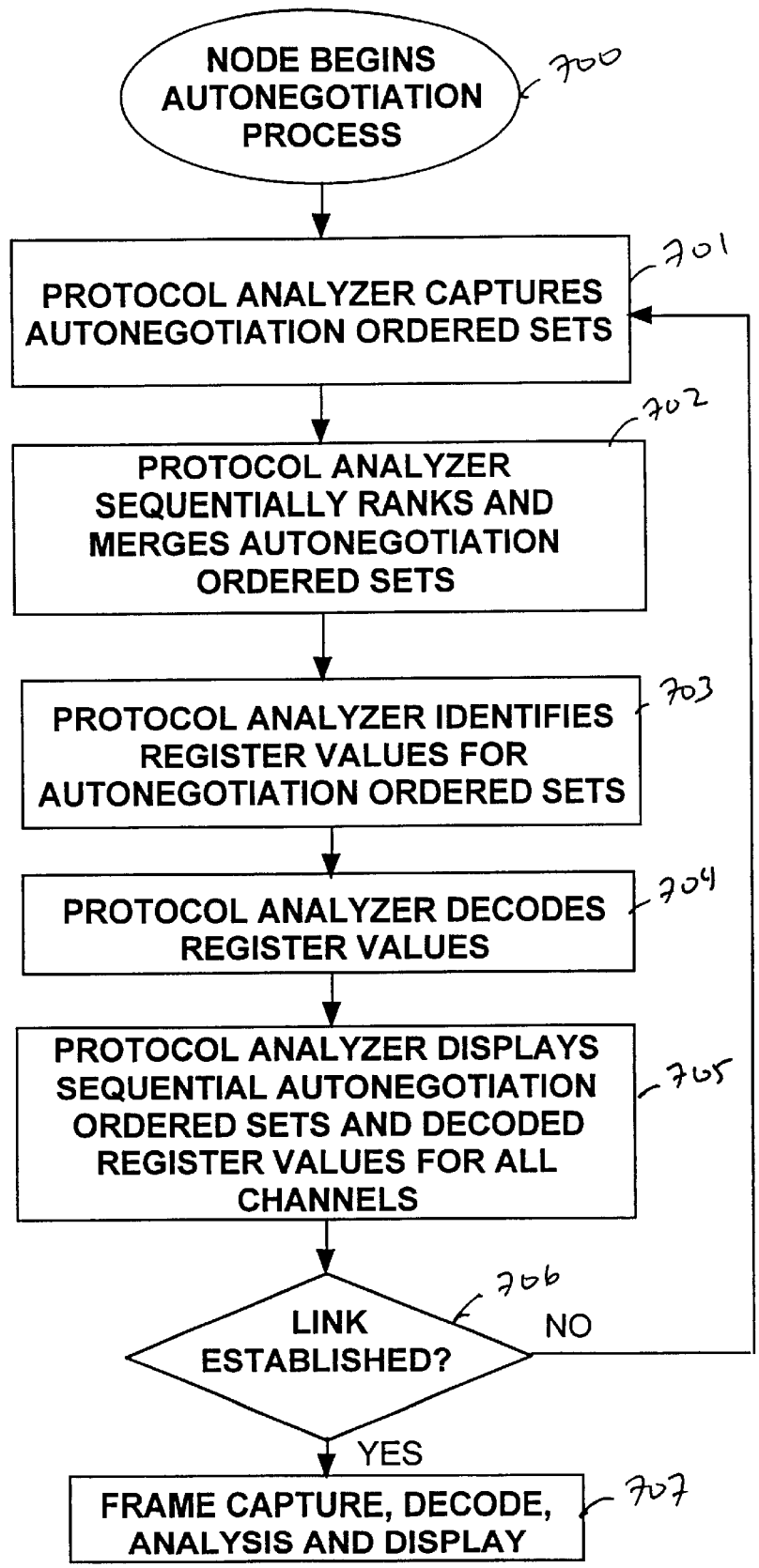
FIG. 7 shows the steps performed by a protocol analyzer in accordance with another embodiment of the invention.

The steps performed in creating a merged sequential list in one embodiment are shown in FIG. 7. The software captures the auto-negotiation ordered sets 701, and creates a merged sequential list 702 using the parsing algorithm described in connection with FIG. 6. The software identifies the register values 703. The software converts each pair of ten-bit codes, corresponding to the register value, to a sixteen-bit word, and then decodes the individual bits within the sixteen-bit word 704. As discussed above, the bits within the sixteen-bit word indicate communication requirements and capabilities of the node sending the sixteen-bit word. For example, as shown in FIG. 8d, if the tenth bit is set to 1, half-duplex communication is enabled, and if it is set to zero, half-duplex communication is disabled.

Figure 8A:
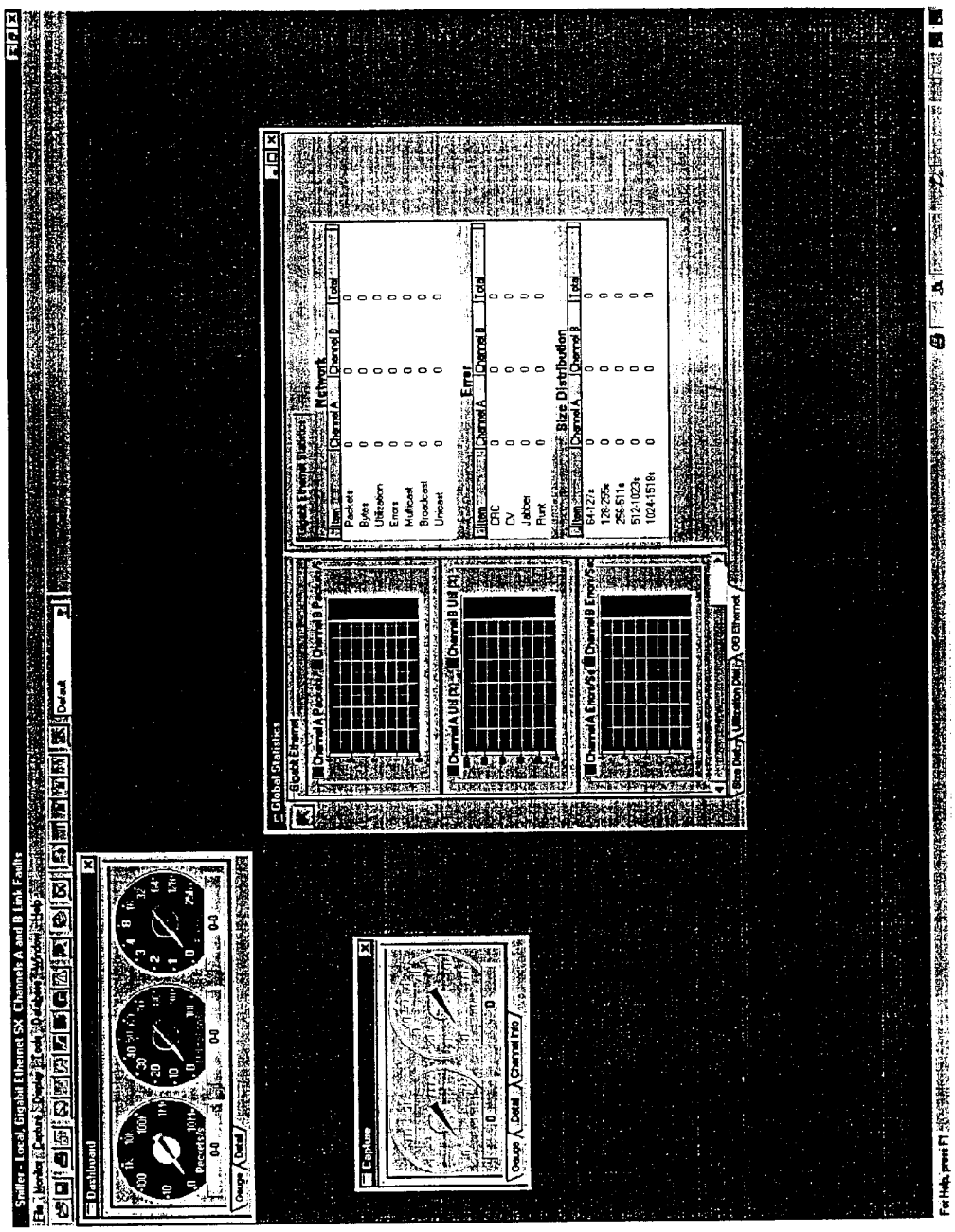
Figure 48:
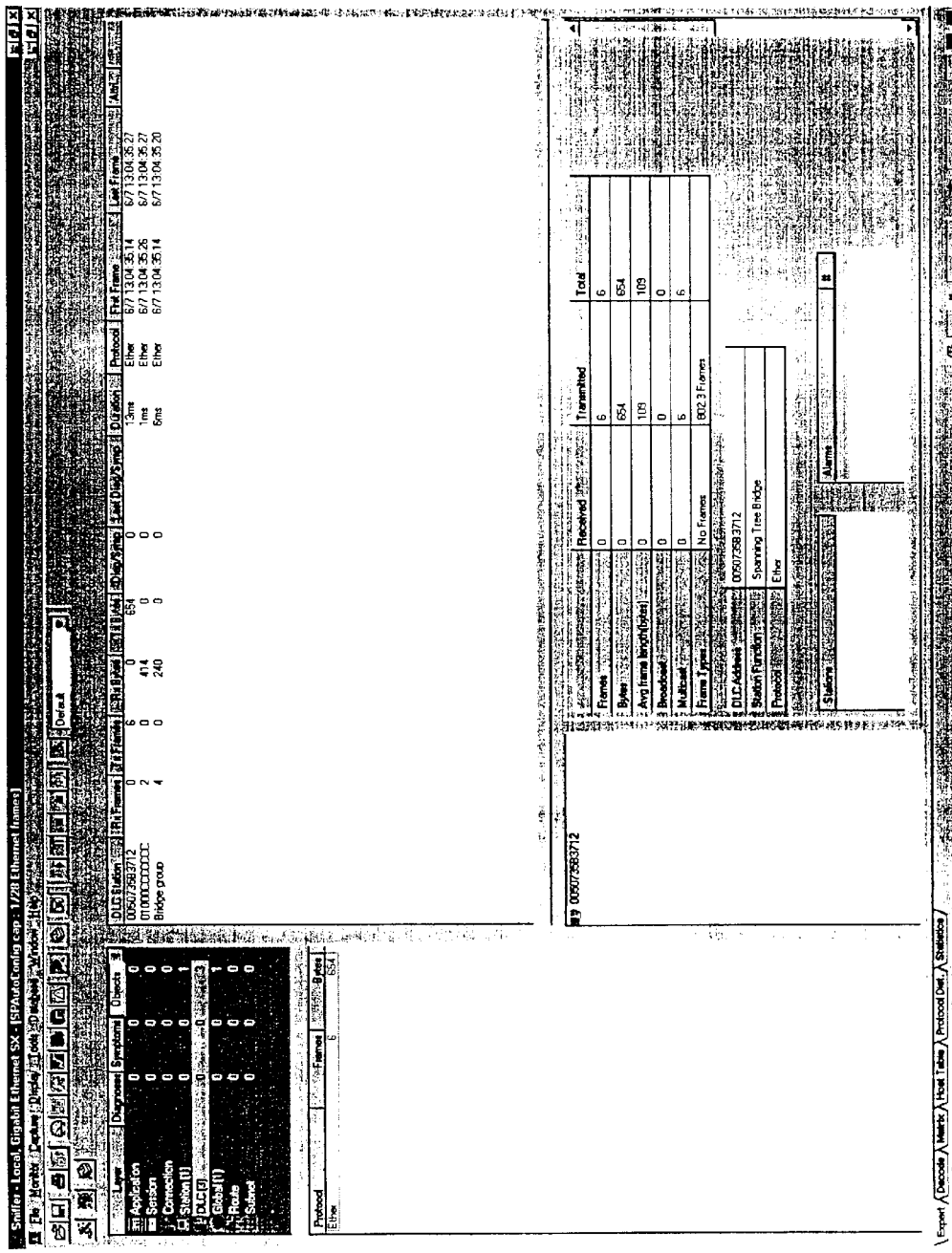

FIG. 8a shows the main window of version 3.0 of the Sniffer Pro software for Gigabit Ethernet topology. Information relating to packet capture, network utilization, and errors is displayed in this window. Captured information, including frames and auto-negotiation ordered sets, may be viewed using several tab windows, including Expert, Decode, Matrix, Host Table, Protocol Distribution and Statistics.

Figure 8B:
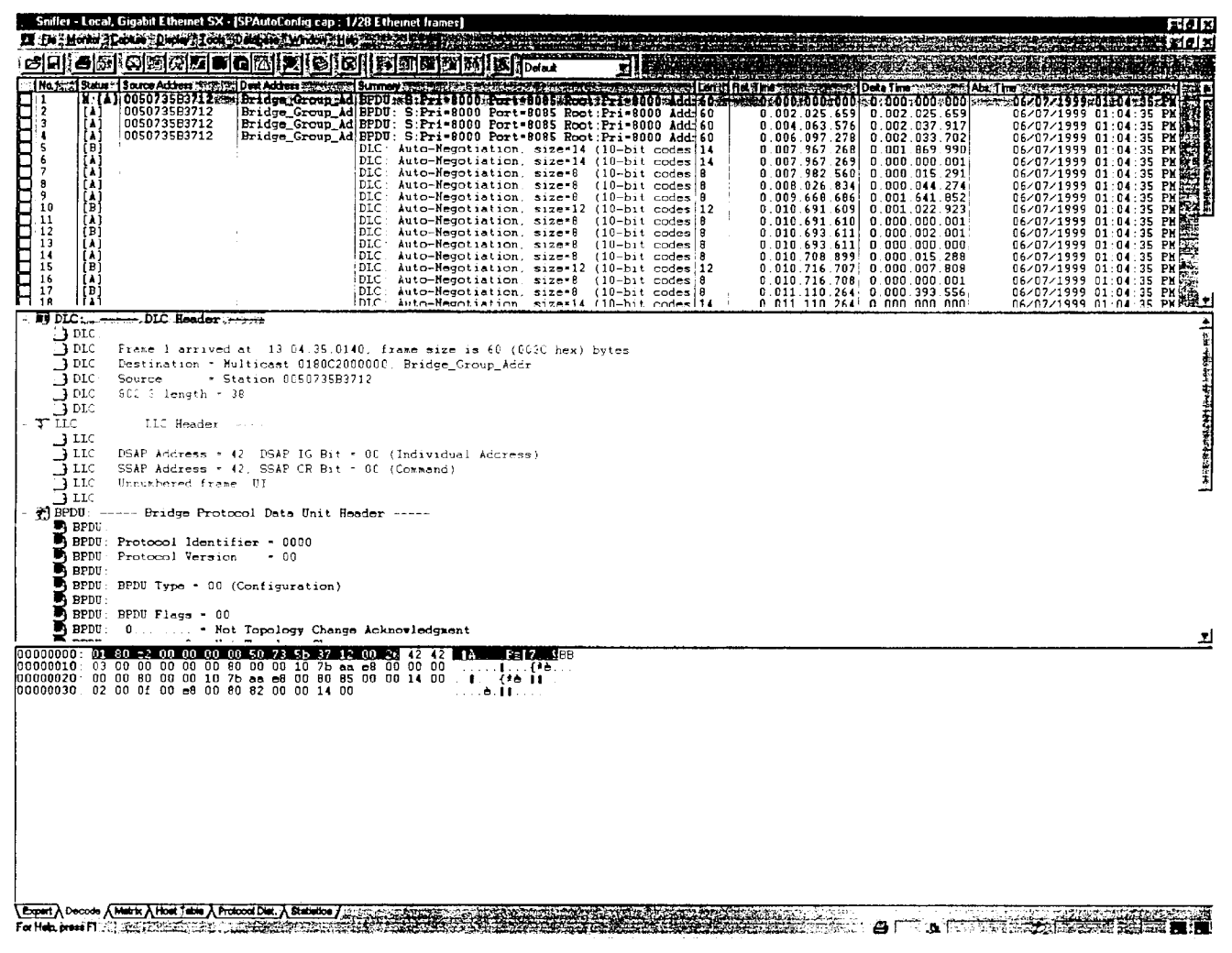

FIG. 8b shows the Decode tab window, which has three panes. The top pane, the Summary Pane, shows all the frames and auto-negotiation ordered sets, merged and in chronological sequence. The Status column indicates whether the frame or auto-negotiation ordered set comes from Channel A (node 1) or Channel B (node 2). For frames, the source and destination are provided. The timestamp for each frame or auto-negotiation ordered set is provided, as well as the absolute time of frame arrival. The second pane, the Detail Pane, shows the protocol decode of the frame/ auto-negotiation ordered set—in this figure, the Detail Pane shows a decode of a frame, which is highlighted in the Summary Pane. The third pane, the Hex Pane, shows the bytes of a frame in hexadecimal, or shows the ten-bit code of an auto-negotiated ordered set—again, in this figure, the Hex Pane shows a decode of a frame, which is highlighted in the Summary Pane.

Figure 8C:
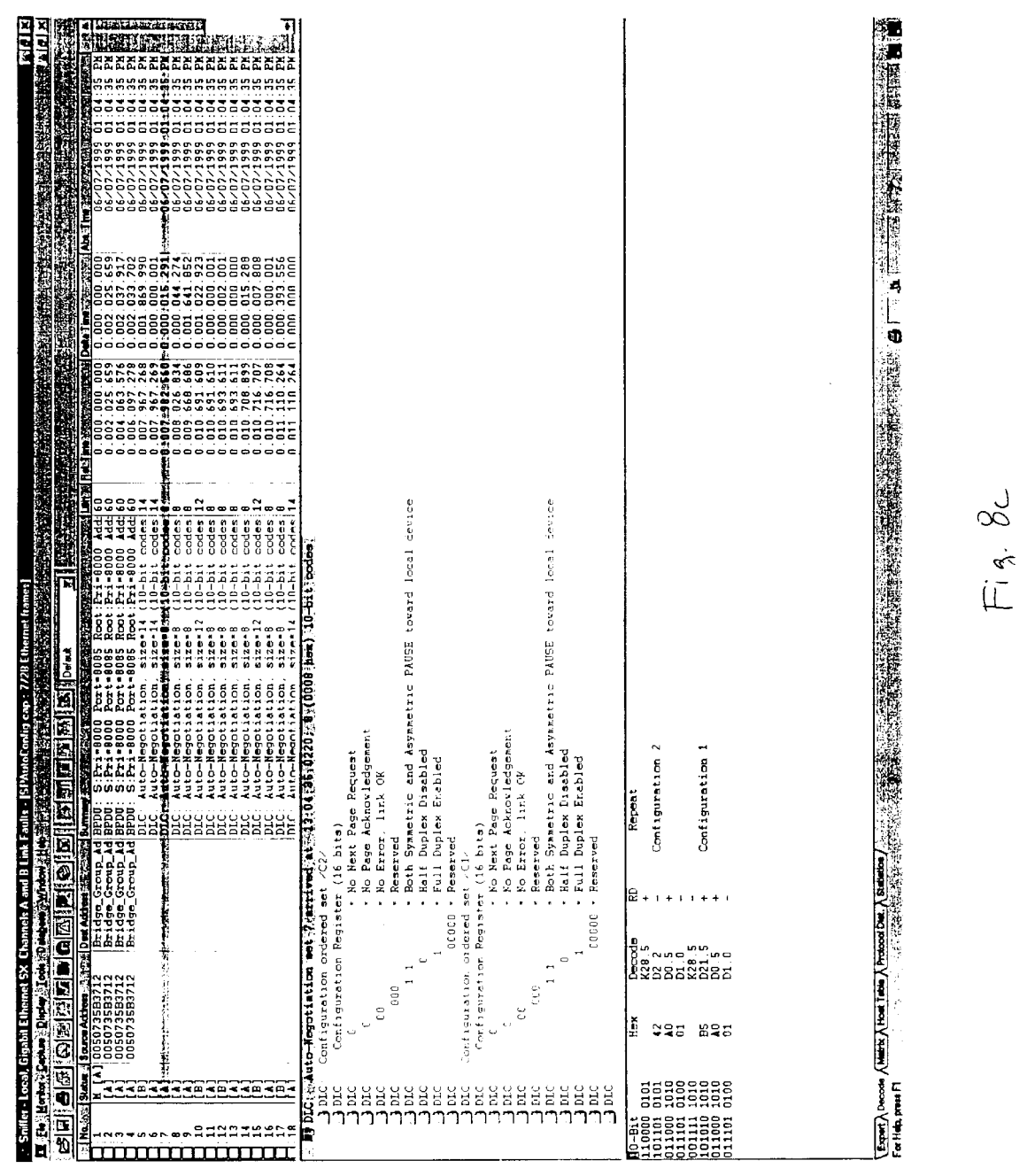
Figure 8D:
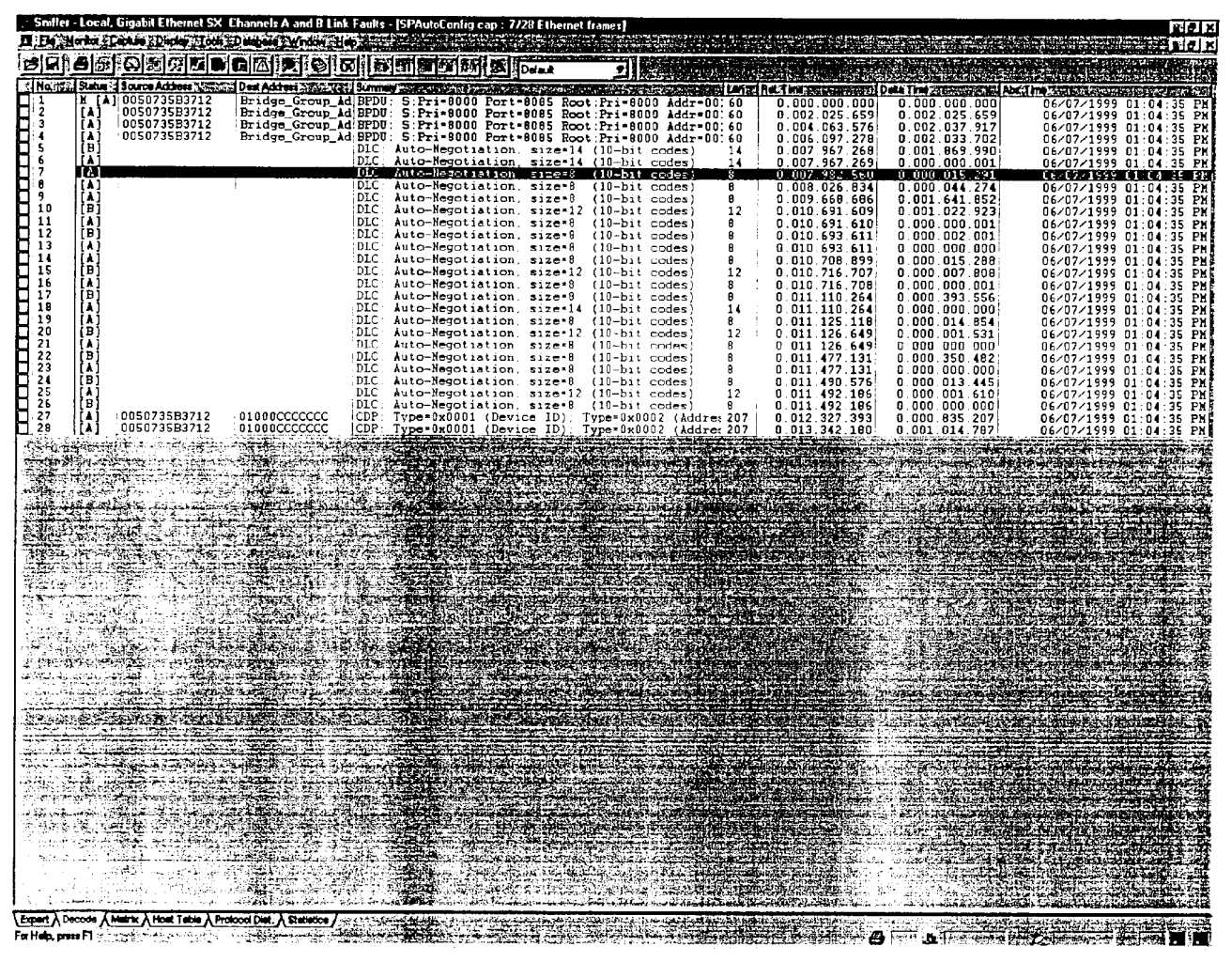

FIG. 8c shows the Decode tab window again, but with an auto-negotiation ordered set highlighted, instead of a frame. The Detail Pane thus shows the decoded information contained in the auto-negotiation register, informing the user that the configuration is no error, link ok, both symmetric and asymmetric pause toward local device, and only full duplex enabled. For example, the decoded information contained in the tenth and eleventh bits of the auto-negotiation register value is displayed: the node sending this register value has half-duplex disabled and full-duplex enabled. Therefore the user need not examine the hexadecimal information or the raw binary information, provided in the Hex Pane, and look up the corresponding decoded information in the IEEE 802.3z standard. Note that both headers, /C1/ and /C2/, are shown for the auto-negotiation ordered set, and that the auto-negotiation register values following each header are the same.

Using the decode window, the user can easily walk through the sequential auto-negotiation ordered sets, viewing the decoded information, and determine what led to a link failure. For example, if node 1 will only communicate in full-duplex, and node 2 will only communicate in half-duplex, no agreement will ever be reached. This will be readily apparent to the user. Or, if one node is improperly programmed, so that it will be unable to negotiate, the link may fail: for example, if a node receives a register value, and through an error in its negotiation program fails to acknowledge that register value, the other node will continue to send the same register value, and the negotiation will not progress. Again, this would be apparent to a user viewing the sequential decoded auto-negotiation ordered sets.

Figure 8F:
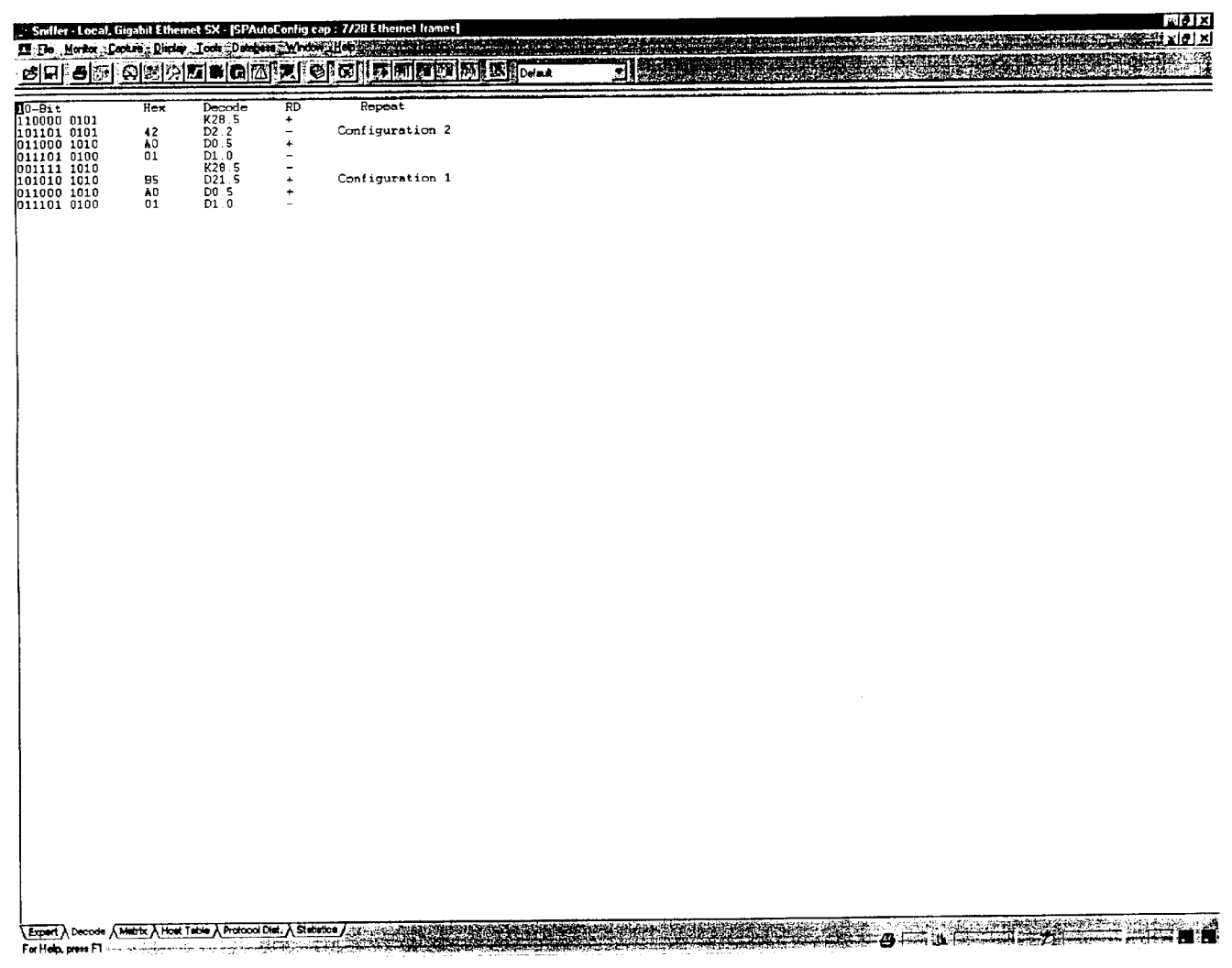

Each of the three panes in the Decode tab window may be viewed separately: FIG. 8d shows the Summary Pane alone; FIG. 8e shows the Decode Pane alone; and FIG. 8f shows the Hex Pane alone.

Two additional tabs, the Statistics tab and the Expert tab, provide analysis of the auto-configuration ordered sets. The Statistics tab, shown in FIG. 8g, tracks the number of auto-negotiation ordered sets in the capture buffer, and the number of individual ten-bit codes in the capture buffer. The Expert tab, shown in FIG. 8h, provides diagnoses and symptoms of problems at each International Standards Organization (ISO) communications layer. The auto-negotiation ordered sets are analyzed to provide symptoms at the physical layer—why the auto-negotiation process is failing. In addition, the Expert tab provides a diagnosis of the likely cause of the problem, based on an analysis of the symptoms causing link failure. The remaining tabs—the Matrix tab, the Host tab, and the Protocol tab—are directed to frame analysis, and do not provide analysis of the auto-negotiation ordered sets.

The Expert tab is shown in FIG. 8h without the auto-negotiation expert analysis. The top-level expert table identifies the number of objects, symptoms and diagnoses identified by the expert at each level. For the auto-negotiation expert analysis, an object will correspond to receipt of an auto-negotiation ordered set by the protocol analyzer. When highlighted by the user, an object table for the auto-negotiation expert analysis will show the starting and ending configuration requested by each party, and whether the link is up—that is, whether an agreement was reached. A "1" in the symptom column in the top-level expert table indicates that a link is down. The user may also highlight the symptoms for the auto-negotiation expert analysis, and a symptom table will indicate where the auto-negotiation process failed—for example, too many code violation errors occurred, or the configurations of the two nodes were unmatched. Finally, the user may highlight the diagnoses button, and the probable cause of the identified symptom will be provided: for example, that node 1 is not responding to the correct auto-negotiation algorithm.

Figure 9:
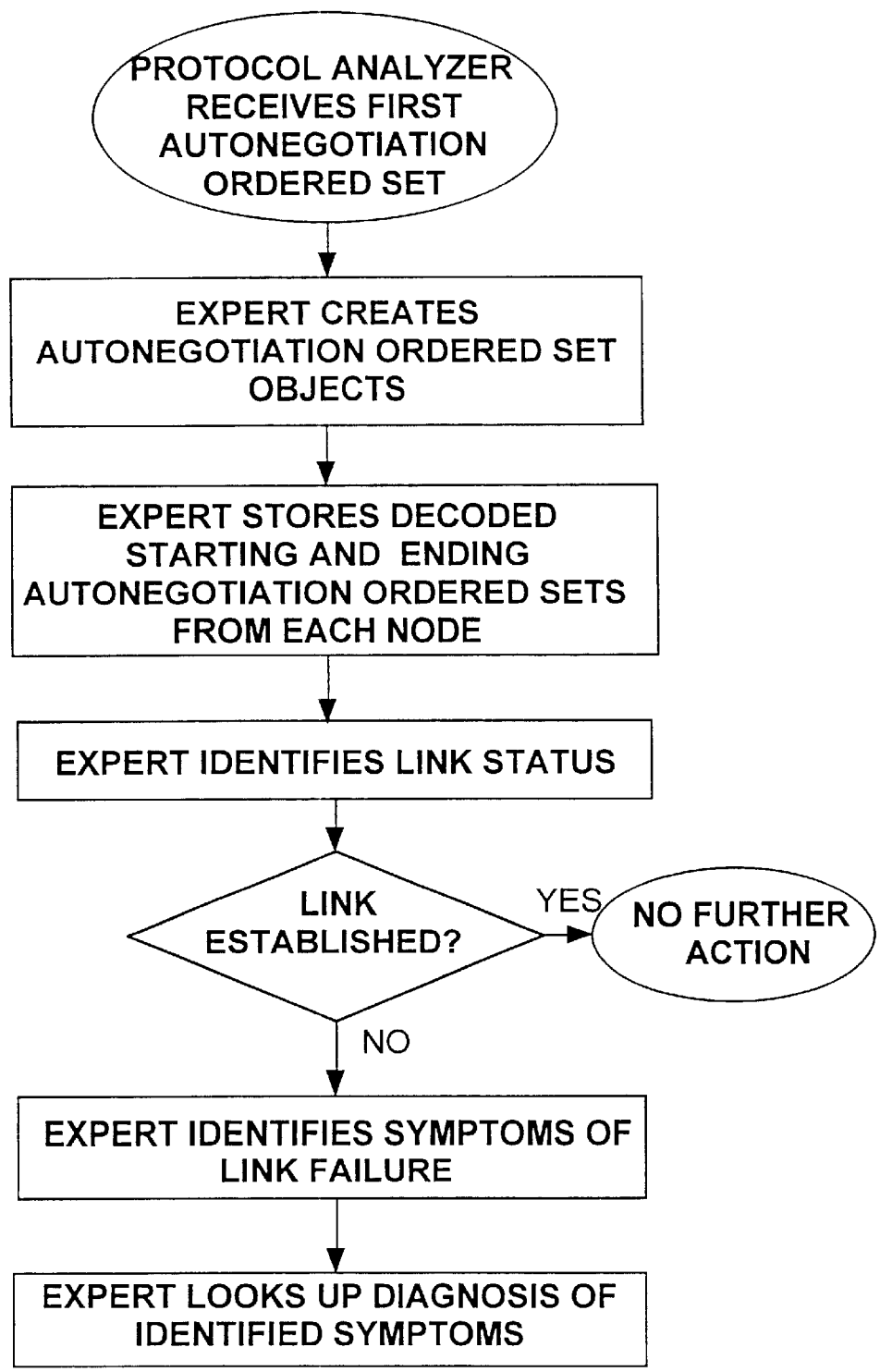
FIG. 9 shows the steps performed by a protocol analyzer in accordance with another embodiment of the invention.

FIG. 9 outlines the steps taken by the Expert analysis portion of the protocol analyzer. When the protocol analyzer receives an auto-negotiation ordered set 900, it creates an auto-negotiation ordered set object 901, which is identified in the top-level expert table 900 in FIG. 9. The software tracks and decodes the first configuration register value for each node, as well as the final configuration register value for each node 952 and whether an agreement is reached 903, as indicated by both nodes sending the "idle" signal. If the link fails, the software analyzes the symptom of the failure 904: whether it was caused by code violations, unmatched configurations, a failure to acknowledge receipt of register values, or some other cause. Finally, based upon a look-up table, the software identifies a likely diagnosis for the identified symptom 905: for example, that the code violation errors may have been caused by a damaged optic fiber.

In conjunction with the software functionality description provided in the present disclosure, a system in accordance with the preferred embodiments may be programmed using methods known in the art as described, for example, in Homer & Ullman, Instant IE4 Dynamic HTML Programmer's Reference, Wrox Press (1997), Francise et. al., Professional Active Server Pages 2.0, Wrox Press (1998), and Zaration, Microsoft C++6.0 Programmer's Guide, Microsoft Press (1998), the contents of each of which is hereby incorporated by reference into the present application.

While preferred embodiments of the invention have been described, these descriptions are merely illustrative and are not intended to limit the present invention. For example, while the disclosure addresses primarily Gigabit Ethernet, the scope of the preferred embodiments is not so limited. Those skilled in the art will recognize that the disclosed software and methods are readily adaptable for broader network analysis applications.

What is claimed is:

1. A graphical user interface for displaying network analysis, comprising:
    a window including a plurality of gauges selected from the group consisting of a first gauge for indicating packet information specified by the network analysis, a second gauge for indicating a network utilization specified by the network analysis, and a third gauge for indicating a number of errors specified by the network analysis;
    wherein each of the gauges includes a rotating indicator for visually indicating a corresponding parameter associated with the network analysis.

2. A graphical user interface as set forth in claim 1, wherein the gauges are displayed simultaneously.

3. A graphical user interface as set forth in claim 1, and further comprising a selector displayed in the window for selectively displaying the gauges and details associated therewith.

4. A graphical user interface as set forth in claim 1, wherein the gauges include the first gauge for indicating the packet information specified by the network analysis, the second gauge for indicating the network utilization specified by the network analysis, and the third gauge for indicating the number of errors specified by the network analysis.

5. A graphical user interface as set forth in claim 1, wherein the network analysis includes Ethernet network analysis.

6. A graphical user interface as set forth in claim 1, wherein a second window is displayed simultaneously with the window for simultaneously displaying different aspects of the network analysis.

7. A graphical user interface as set forth in claim 6, wherein the second window indicates a distribution specified by the network analysis.

8. A graphical user interface for displaying network analysis, comprising:
    a window including a plurality of gauges for indicating different aspects of the network analysis;
    wherein the window is displayed simultaneously with at least one other window displaying a different aspect of the network analysis;
    wherein each of the gauges includes a rotating indicator for visually indicating a corresponding parameter associated with the network analysis.

9. A graphical user interface for displaying Ethernet network analysis, comprising:
    a plurality of tabs including an expert tab, a decode tab, a protocol tab, and a statistics tab;
    a first window including a plurality of gauges including a first gauge for indicating packet information specified by the network analysis, a second gauge for indicating a network utilization specified by the network analysis, and a third gauge for indicating a number of errors specified by the network analysis, the first window further including at least one tab for selectively displaying the gauges;
    a second window indicating a distribution specified by the network analysis;
    wherein the first window and the second window are displayed simultaneously for enhanced Ethernet network analysis;
    wherein each of the gauges includes a rotating indicator for visually indicating a corresponding parameter associated with the network analysis.

10. A method for displaying network analysis, comprising:
    displaying a first gauge for indicating a first aspect of the network analysis;
    displaying a second gauge for indicating a second aspect of the network analysis; and
    displaying a third gauge for indicating a third aspect of the network analysis;
    wherein each of the gauges includes a rotating indicator for visually indicating a corresponding parameter associated with the network analysis.

11. A method as set forth in claim 10, wherein the gauges are displayed simultaneously.

12. A method as set forth in claim 10, and further comprising displaying at least one tab for selectively displaying the gauges and details associated therewith.

13. A method as set forth in claim 10, wherein the gauges include a first gauge for indicating packet information specified by the network analysis, a second gauge for indicating a network utilization specified by the network analysis, and a third gauge for indicating a number of errors specified by the network analysis.

14. A method as set forth in claim 10, wherein the network analysis includes Ethernet network analysis.

15. A computer program product for displaying network analysis, comprising:
    computer code for displaying a first gauge for indicating a first aspect of the network analysis;
    computer code for displaying a second gauge for indicating a second aspect of the network analysis; and
    computer code for displaying a third gauge for indicating a third aspect of the network analysis;
    wherein each of the gauges includes a rotating indicator for visually indicating a corresponding parameter associated with the network analysis.

16. A system for displaying network analysis, comprising:
    means for displaying a first gauge for indicating a first aspect of the network analysis;
    means for displaying a second gauge for indicating a second aspect of the network analysis; and
    means for displaying a third gauge for indicating a third aspect of the network analysis;
    wherein each of the gauges includes a rotating indicator for visually indicating a corresponding parameter associated with the network analysis.

17. A method for displaying Ethernet network analysis, comprising:
    displaying a first interface;
    simultaneously displaying two windows on the first interface including a first window and a second window;
    said first window of the first interface including a plurality of gauges including a first gauge for indicating packet information specified by the network analysis, a second gauge for indicating a network utilization specified by the network analysis, and a third gauge for indicating a number of errors specified by the network analysis, the first window further including a pair of tabs for selectively displaying the gauges;

said second window of the first interface including a distribution specified by the network analysis;

displaying an expert tab, a decode tab, and a statistics tab;

in response to the selection of the decode tab, displaying a second interface including the expert tab, the decode tab, and the statistics tab;

simultaneously displaying three panes of the second interface including a first pane, a second pane, and a third pane;

said first pane of the second interface including summary information associated with packets listed in a sequential sequence;

said second pane of the second interface including decode information associated with one of the packets highlighted in the first pane of the second interface;

said third pane of the second interface including hexadecimal formatted bytes of one of the packets highlighted in the first pane of the second interface;

in response to the selection of the statistics tab, displaying a third interface including the expert tab, the decode tab, and the statistics tab;

said third interface including a list of statistics;

in response to the selection of the expert tab, displaying a fourth interface including the expert tab, the decode tab, and the statistics tab; and simultaneously displaying two panes of the fourth interface including a first pane and a second pane;

said first pane of the fourth interface including a plurality of objects for being selected by a user;

said second pane of the fourth interface including statistics associated with the selected objects;

wherein each of the gauges includes a rotating member for visually indicating a corresponding parameter associated with the network analysis by rotating about a central axis and pointing to peripheral parameter indicia indicating a real-time current value of the corresponding parameter associated with the network analysis.

18. A graphical user interface for displaying network analysis, comprising:

window including a plurality of gauges including a first gauge for indicating packet information specified by the network analysis, and a second gauge for indicating buffer information specified by the network analysis;

wherein each of the gauges includes a rotating indicator for visually indicating a corresponding parameter associated with the network analysis.

* * * * *